United States Patent
Eguchi et al.

(10) Patent No.: US 7,386,149 B2
(45) Date of Patent: Jun. 10, 2008

(54) METHOD AND APPARATUS FOR EMBEDDING DIGITAL-WATERMARK USING ROBUSTNESS PARAMETER

(75) Inventors: Takami Eguchi, Tokyo (JP); Keiichi Iwamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/740,770

(22) Filed: Apr. 26, 2007

(65) Prior Publication Data

US 2007/0201099 A1    Aug. 30, 2007

Related U.S. Application Data

(63) Continuation of application No. 10/659,037, filed on Sep. 9, 2003, now abandoned.

(30) Foreign Application Priority Data

Sep. 10, 2002  (JP)  ............... 2002-264187

(51) Int. Cl.
  *G06K 9/00* (2006.01)
(52) U.S. Cl. ............. 382/100; 382/232; 713/176; 358/3.28; 380/54; 380/55
(58) Field of Classification Search ........... 382/100, 382/232; 713/176; 380/54, 55; 358/3.28
See application file for complete search history.

(56) References Cited

U.S. PATENT DOCUMENTS

| | | | | |
|---|---|---|---|---|
| 5,745,600 A * | 4/1998 | Chen et al. | ............... | 382/218 |
| 5,761,686 A * | 6/1998 | Bloomberg | ............... | 715/234 |
| 5,861,619 A * | 1/1999 | Horino et al. | ............... | 235/470 |
| 6,246,775 B1 | 6/2001 | Nakamura et al. | | |
| 6,731,775 B1 * | 5/2004 | Ancin | ............... | 382/100 |
| 6,898,297 B2 * | 5/2005 | Katsura et al. | ............... | 382/100 |
| 6,983,056 B1 * | 1/2006 | Amano | ............... | 382/100 |
| 7,209,572 B2 * | 4/2007 | Iwamura et al. | ............... | 382/100 |
| 7,245,740 B2 * | 7/2007 | Suzaki | ............... | 382/100 |

(Continued)

FOREIGN PATENT DOCUMENTS

GB    WO 01/26376 A1 * 10/1999

(Continued)

OTHER PUBLICATIONS

A Novel Semi-Fragile Document Watermarking Algorithm, Zhang Min-rui , Wang Yi-xuan, Yao Zhan, School of Communications and Information Engineering, Xi'an Univ. of Science & Technology, Xi'an, China, IEEE 2007.*

(Continued)

*Primary Examiner*—Andrew W. Johns
*Assistant Examiner*—Nancy Bitar
(74) *Attorney, Agent, or Firm*—Canon U.S.A. Inc. IP Division

(57) ABSTRACT

An apparatus receives a document image and digital-watermark information and determines an embedding capacity based on a number of the letters in the document image. The apparatus determines whether or not the entire digital-watermark information is capable of being embedded in the document image based on the determined embedding capacity and embeds the digital-watermark information in the document image based on a result of the determination of whether or not the entire digital-watermark information is capable of being embedded in the document image.

12 Claims, 23 Drawing Sheets

U.S. PATENT DOCUMENTS

| | | | |
|---|---|---|---|
| 7,260,238 B2 * | 8/2007 | Iwamura et al. | 382/100 |
| 7,269,274 B2 * | 9/2007 | Iwamura et al. | 382/100 |
| 2003/0118211 A1 * | 6/2003 | Eguchi et al. | 382/100 |
| 2004/0091132 A1 * | 5/2004 | Eguchi et al. | 382/100 |
| 2004/0220962 A1 * | 11/2004 | Kaneda | 707/102 |

FOREIGN PATENT DOCUMENTS

| | | |
|---|---|---|
| JP | 09-186603 A | 7/1997 |

OTHER PUBLICATIONS

Electronic Document Data Hiding Technique using Inter-Character Space, Nopporn Chotikakamthorn, IEEE 1998.*

Y. Nakamura and K. Matsui, "Digital Watermarking onto Japanese Documents by Seal Image," Info. Proc. Soc. of Japan Journal, Nov. 1997, vol. 38, No. 11, p. 2356-2361, Japan.

An Oblivious Robust Digital Watermark Technique for Still Images Using DCT Phase Modulation, Faisal Alturki and Russell Mersereau, Center for Signal and Image Processing, IEEE 2000.

* cited by examiner

FIG. 20

| REPETITION NUMBER | IMAGE-QUALITY PARAMETER | EMBEDDING CAPACITY |
|---|---|---|
| 3 = $n_1$ | 2 = $q_1$ | 200 $l_1$ |
| 4 | 2 | 125 |
| 5 $n_2$ | 2 $q_2$ | 76 $l_2$ |
| 6 | 2 | 61 |
| 7 $n_3$ | 2 $q_3$ | 48 $l_3$ |
| 8 | 2 | 40 |
| 9 $n_4$ | 2 $q_4$ | 33 $l_4$ |
| 10 | 2 | 28 |
| 11 $n_5$ | 2 $q_5$ | 24 $l_5$ |
| 12 | 2 | 21 |
| 13 $n_6$ | 2 $q_6$ | 18 $l_6$ |
| 14 | 2 | 15 |
| 15 $n_7$ | 2 $q_7$ | 13 $l_7$ |
| 16 | 2 | 11 |
| 17 $n_8$ | 2 $q_8$ | 9 $l_8$ |
| 18 | 2 | 8 |
| 19 $n_9$ | 2 $q_9$ | 6 $l_9$ |
| 20 | 2 | 4 |
| 21 $n_{10}$ | 2 $q_{10}$ | 3 $l_{10}$ |

FIG. 21

| EMBEDDING STRENGTH | REPETITION NUMBER | IMAGE-QUALITY PARAMETER | EMBEDDING CAPACITY |
|---|---|---|---|
| 1 | $n_1$ | $q_1$ | $I_1$ |
| 2 | $n_2$ | $q_2$ | $I_2$ |
| 3 | $n_3$ | $q_3$ | $I_3$ |
| 4 | $n_4$ | $q_4$ | $I_4$ |
| 5 | $n_5$ | $q_5$ | $I_5$ |
| 6 | $n_6$ | $q_6$ | $I_6$ |
| 7 | $n_7$ | $q_7$ | $I_7$ |
| 8 | $n_8$ | $q_8$ | $I_8$ |
| 9 | $n_9$ | $q_9$ | $I_9$ |
| 10 | $n_{10}$ | $q_{10}$ | $I_{10}$ |

METHOD AND APPARATUS FOR EMBEDDING DIGITAL-WATERMARK USING ROBUSTNESS PARAMETER

CROSS REFERENCE TO RELATED APPLICATIONS

This application is a continuation of U.S. patent application Ser. No. 10/659,037, filed Sep. 9, 2003, and claims the benefit of Japanese Application No. 2002/264187 filed Sep. 10, 2002.

BACKGROUND OF THE INVENTION

1. Field of the Invention

The present invention relates to a technique for embedding digital-watermark information in an image.

2. Description of the Related Art

In recent years, digital data, such as text data, image data, and voice data, has been widely used, and it has become necessary to prevent unauthorized duplication of the data. Also, documents and images are often used in a printed form, and thus unauthorized duplication of the printed material must be prevented.

Digital-watermark embedding has been known as a technique for preventing unauthorized duplication. In this technique, original digital image data is modulated so that the data is imperceptible or difficult to perceive, and another piece of information is embedded in the data.

When digital-watermark information is embedded, it is very important to determine whether or not necessary amount of information can be embedded in original image data.

The following three elements are in tradeoff relationship: (1) quality of image data in which digital-watermark information is embedded; (2) robustness to attack (image editing and so forth) on the image data; and (3) the amount of digital-watermark information to be embedded in the original image data.

For example, if degradation of image quality caused by digital-watermark embedding is suppressed, robustness to attack is reduced or the amount of information to be embedded is reduced. If the amount of information to be embedded is increased, degradation of image quality caused by digital-watermark embedding becomes significant or robustness to attack is reduced. If robustness to attack is increased, degradation of image quality caused by digital-watermark embedding becomes significant or the amount of information to be embedded is reduced. The robustness to attack is referred to also as embedding strength.

As a technique for embedding digital-watermark information in a multivalued image, a method using redundancy of pixel density has been known. Also, as a technique for embedding digital-watermark information in a binary document image, a digital-watermark embedding method using the characteristic of the document image has been known. For example, Japanese Patent Laid-Open No. 9-186603 (U.S. Pat. No. 5,861,619) discloses a method for embedding digital-watermark information by changing the length of space between words. In such a method, digital-watermark information is represented by changing the length of space between words or letters, and 1-bit information (1 or 0) is allocated in accordance with the length of two spaces.

Also, "Digital Watermarking onto Japanese Documents by Seal Image", written by Yasuhiro NAKAMURA and Kineo MATSUI (Information Processing Society of Japan Journal Vol. 38, No. 11, November 1997), discloses a technique of embedding digital-watermark information by rotating letters so as to change the inclination angle of the letters.

FIG. 24 shows an example of the above-described known art. For example, when a letter is rotated clockwise, "1" is embedded therein as shown in (1) in FIG. 24. When a letter is rotated counterclockwise, "0" is embedded therein as shown in (2) in FIG. 24. Watermark may be embedded in sequential letters, or every few letters, or in a letter at a predetermined position. In FIG. 24, the letter "C" is rotated clockwise and the letter "E" is rotated counterclockwise. Accordingly, information "10" is embedded in this case.

Now, a method for embedding digital-watermark information in a multivalued image will be described. Hereinafter, image data represents a monochrome multivalued image for clarity.

A binary data sequence is regarded as additional information Inf. The additional information Inf is information including some bits, each bit representing "0" or "1". Then, digital-watermark information w is generated based on the additional information Inf. In the simplest method of generating the digital-watermark information w, an image is scanned by raster scanning and the additional information Inf is associated with the position of image data I. When a bit represents "0", −1 is allocated, and when a bit represents "1", +1 is allocated.

Then, the image data I and the digital-watermark information w are input, the digital-watermark information w is embedded in the image data I, and then image data I' in which the digital-watermark information w is embedded is output.

For example, digital-watermark information embedding is performed in accordance with an equation: $I'_{i,j} = I_{i,j}(1 + aw_{i,j})$. Herein, $I'_{i,j}$ is image data in which digital-watermark information is embedded, $I_{i,j}$ is image data before the digital-watermark information is embedded therein, $w_{i,j}$ is the digital-watermark information, i and j are parameters representing x and y coordinates of I and I' and w, respectively, and a is a parameter specifying the embedding strength of the digital-watermark.

Now, the strength a will be described. For example, when the strength a is "0.01", it means that about 1% of the element value of an original image is changed. By increasing the value of a, digital-watermark information which is robust to attack can be embedded. In that case, however, quality of the image is significantly degraded. On the other hand, by decreasing the value of a, the robustness to attack will be reduced. In that case, however, degradation of the image quality can be suppressed.

That is, by adequately setting the value of a, robustness to attack and the quality of water-marked image can be kept in balance. When digital-watermark information is embedded in a multivalued image, the amount of information which can be embedded therein is effectively specified based on the size of the original image.

On the other hand, when digital-watermark information is embedded in a document image, the amount of information which can be embedded is generally proportional to the number of letters. The documents may include newspapers, presentation material, and postcards, and the number of letters included in these documents is different from each other. Therefore, when digital-watermark information is embedded in a document image, it is difficult and is not preferable to estimate the amount of information which can be embedded therein in advance.

However, an efficient method of embedding digital-watermark information in a document image considering the above-described three elements has not been known. Also, an efficient method of embedding digital-watermark information in a multivalued image considering the above-described three elements has not been established.

SUMMARY OF THE INVENTION

The present invention has been made in view of the above-described problems, and it is a major object of the present invention to efficiently embedding digital-watermark information in an image by considering the above-described three elements. In particular, it is an object of the present invention to provide an effective technique of embedding digital-watermark information in a document image.

In order to achieve the above-described objects, a digital-watermark embedding method of the present invention comprises: a generating step of generating digital-watermark information; an input step of inputting an image; a setting step of setting a first parameter determining robustness to attack on the digital-watermark information embedded in the image and a second parameter determining quality of the image in which the digital-watermark information is embedded; an embedding step of embedding the digital-watermark information in the input image by using the first and second parameters; a determination step of determining whether or not the entire digital-watermark information can be embedded in the image; an update step of updating one of the parameters so as to embed a larger amount of digital-watermark information in the image when it is determined that the entire digital-watermark information cannot be embedded in the determination step, the update step being performed as a first stage; and an embedding step of embedding the digital-watermark information in the input image again by using the updated parameter. The determination step is performed for each of the embedding steps.

Further objects, features, and advantages of the present invention will become apparent from the following description of the preferred embodiments with reference to the attached drawings.

BRIEF DESCRIPTION OF THE DRAWINGS

FIG. 20 shows combinations of values for obtaining each embedding capacity.

FIG. 21 shows combinations of values corresponding to each embedding strength.

DESCRIPTION OF THE PREFERRED EMBODIMENTS

Hereinafter, preferred embodiments of the present invention will be described in order.

First, a digital-watermark embedding device which can be applied to the embodiments of the present invention will be described with reference to the drawings.

Figure 1:
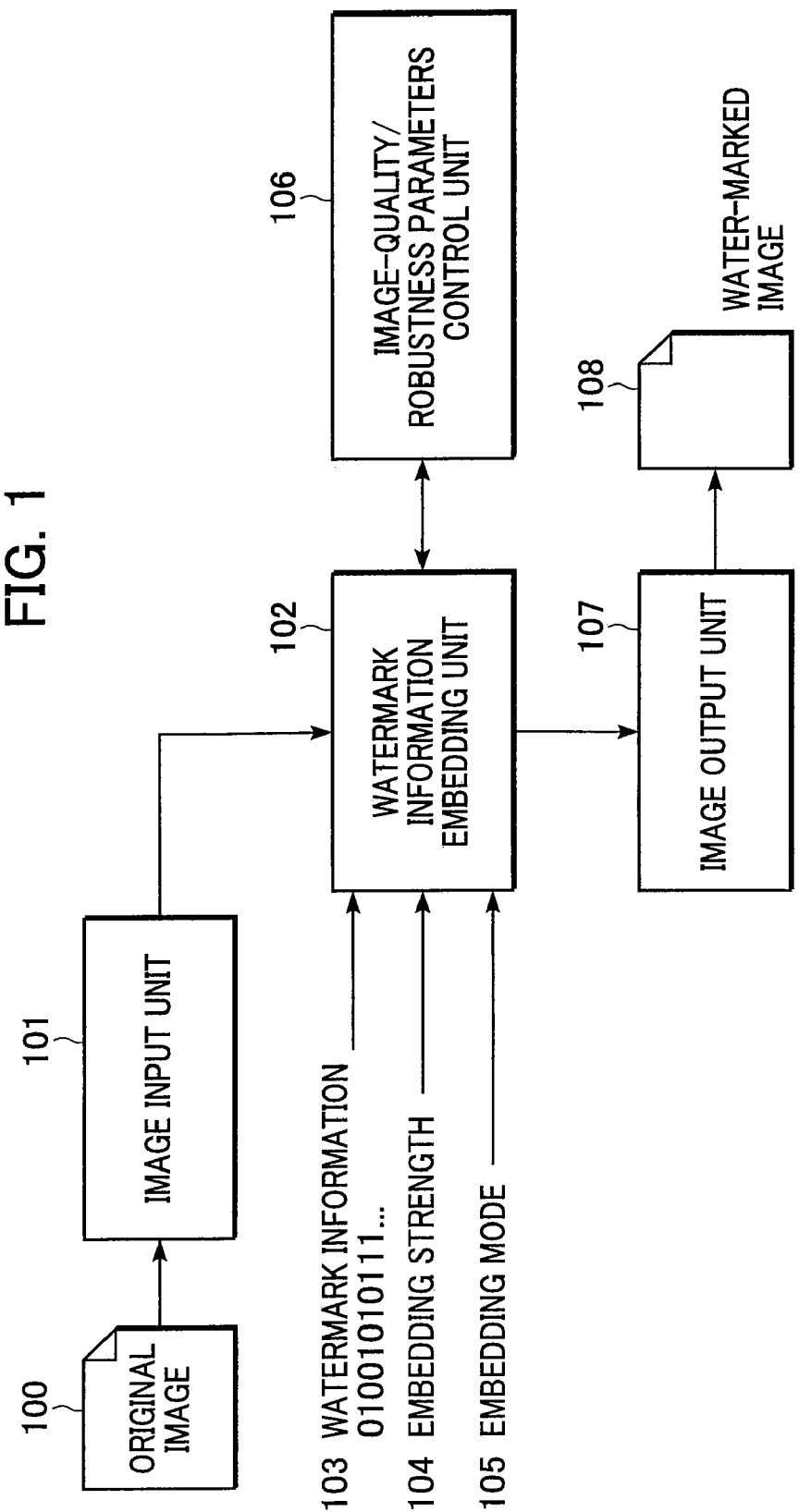
FIG. 1 shows a basic configuration of a digital-watermark embedding device.

FIG. 1 shows a basic configuration of the digital-watermark embedding device which can be applied to the embodiments of the present invention.

As shown in FIG. 1, the digital-watermark embedding device basically includes an image input unit 101; a watermark information embedding unit 102; an image-quality/robustness parameters control unit 106; and an image output unit 107.

As shown in FIG. 1, an image (original image 100) to which digital-watermark information 103 is to be embedded is input to the image input unit 101 (for example, a scanner 1417 in FIG. 23, described later). Also, the digital-watermark information 103, embedding strength 104, and an embedding mode 105 are input to the watermark information embedding unit 102. Then, the watermark information embedding unit 102 embeds the digital-watermark information in the original image 100 by using the input digital-watermark information 103, the embedding strength 104, and the embedding mode 105. Accordingly, a water-marked image 108 is generated. The water-marked image 108 is output from the image output unit 107 (for example, a printer 1416 in FIG. 23, described later).

Herein, a normal mode and two types of forced embedding modes are provided as the embedding mode 105. Also, an initial value of a parameter group for deciding robustness/ image-quality degradation is set based on specified embedding strength 104. Hereinafter, the outline of each mode will be described.

In the normal mode, digital-watermark information is embedded by using the set initial value. However, when the amount of information which can be embedded is limited, the embedding is aborted.

On the other hand, in the forced embedding mode, a desired amount of digital-watermark information is forcedly embedded. The forced embedding mode includes two types of modes: a robustness-priority forced embedding mode and an image-quality-priority forced embedding mode.

The robustness-priority forced embedding mode is used for generating the water-marked image 108 which is robust to future possible attacks, such as image editing. Therefore, in this mode, the parameter group is changed so that the robustness to attack can be maintained while the image quality is degraded.

However, when the desired amount of digital-watermark information cannot be embedded by changing the parameter group in the above-described manner, the parameter group is changed again so as to also reduce the robustness to attack. In order to perform the determination, a threshold value for defining the tolerance of degradation of each of robustness to attack and image quality is set in advance.

If both of robustness to attack and image quality are out of the degradation tolerance, it is determined that the tolerance is too small to embed the desired amount of information.

However, in the forced embedding mode, the desired amount of digital-watermark information must be forcedly embedded. Therefore, when both of robustness to attack and image quality are out of the tolerance, the tolerance of image-quality degradation is increased and the parameter group is changed so as to further degrade the image quality.

Accordingly, a larger amount of digital-watermark information can be embedded, and thus the desired amount of digital-watermark information may be embedded. However, when the parameter group is changed so as to degrade the image quality, degradation of the image quality may reach its limit. For example, in digital-watermark embedding in which spaces between letters are adjusted, when letters contact each other, degradation of image quality reaches its limit. When the degradation of image quality reaches its limit, the parameter is changed so as to reduce the robustness to attack within the tolerance.

The threshold value may have a plurality of levels. In order to embed a desired amount of digital-watermark information, the image quality may be degraded first, and then the parameter group may be changed in the following order: degrade image quality, reduce robustness, degrade image quality, reduce robustness, degrade image quality, . . . .

On the other hand, the image-quality-priority forced embedding mode is used for minimizing degradation of the quality of the water-marked image 108. Therefore, when the desired amount of digital-watermark information cannot be embedded, the parameter is first changed so as to reduce the robustness to attack, not to degrade the image quality.

However, when the desired amount of digital-watermark information cannot be embedded by changing the parameter group in the above-described manner, the parameter group is changed again so as to also degrade the image quality within the tolerance. In order to perform the determination, a threshold value for defining the tolerance of degradation of each of robustness to attack and image quality is set in advance.

If both of robustness to attack and image quality are out of the degradation tolerance, it is determined that the tolerance is too small to embed the desired amount of information.

However, in the forced embedding mode, the desired amount of digital-watermark information must be forcedly embedded. Therefore, when both of robustness to attack and image quality are out of the tolerance, the tolerance of attack-robustness degradation is increased and the parameter group is changed so as to further reduce the robustness to attack.

Accordingly, a larger amount of digital-watermark information can be embedded, and thus the desired amount of digital-watermark information may be embedded. However, when the parameter group is changed so as to reduce the robustness to attack, degradation of the robustness may reach its limit. When the degradation of robustness to attack reaches its limit, the parameter is changed so as to degrade the image quality within the tolerance.

The threshold value may have a plurality of levels. In order to embed a desired amount of digital-watermark information, the robustness to attack may be reduced first, and then the parameter group may be changed in the following order: reduce robustness, degrade image quality, reduce robustness, degrade image quality, reduce robustness, . . . .

The above-described process in each mode is performed by the image-quality/robustness parameters control unit 106.

By setting the threshold value and the embedding modes, a desired amount of digital-watermark information can be embedded within the degradation tolerances of robustness to attack and image quality, the tolerances being defined by a user in advance.

Hereinafter, a specific method in each embodiment will be described.

First Embodiment

First, a digital-watermark embedding technique according to a first embodiment of the present invention will be described.

Figure 2:
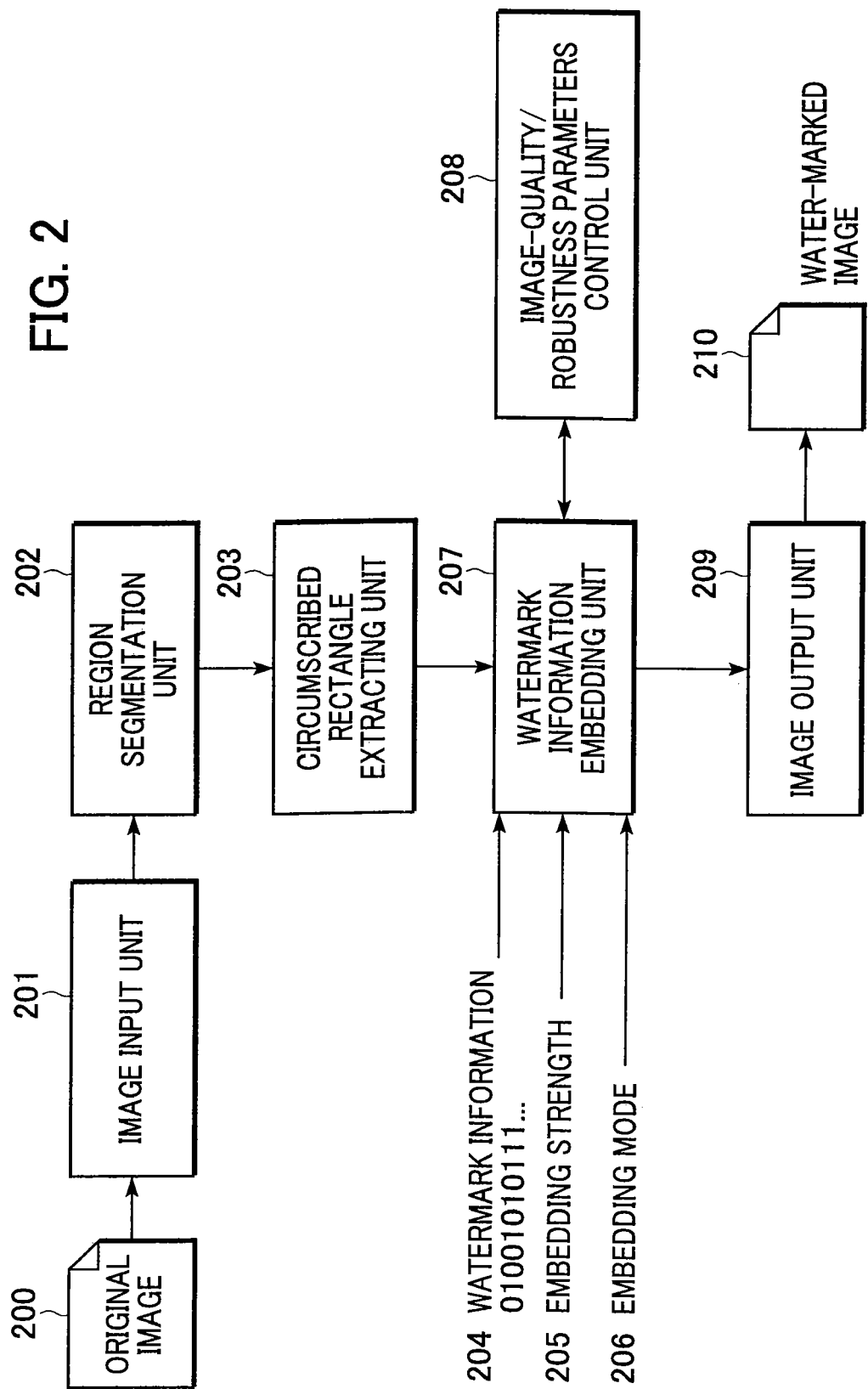
FIG. 2 shows the configuration of a digital-watermark embedding device of a first embodiment.

FIG. 2 shows the configuration of a digital-watermark embedding device of the first embodiment. As in the above-described configuration shown in FIG. 1, the digital-watermark embedding device includes an image input unit 201; a watermark information embedding unit 207; an image-quality/robustness parameters control unit 208; and an image output unit 209.

Further, in FIG. 2, a region-segmentation unit 202 for dividing a region of an input original image 200 and a circumscribed rectangle extracting unit 203 for extracting a region of a letter are provided. Digital-watermark information 204, embedding strength 205, and an embedding mode 206 are the same as the above-described digital-watermark information 103, the embedding strength 104, and the embedding mode 105, respectively.

Figure 3:
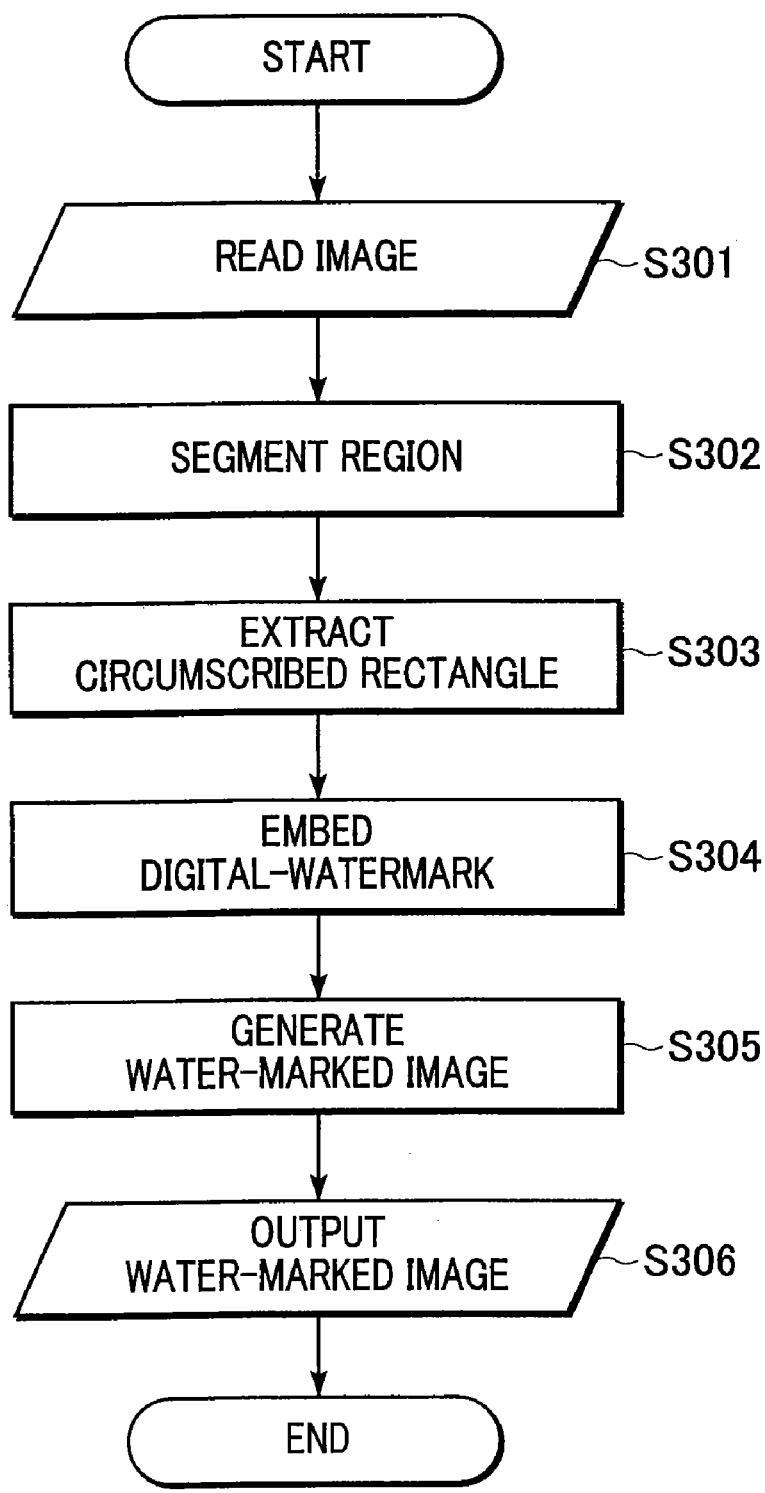
FIG. 3 is a flowchart of an operation of the digital-watermark embedding device shown in FIG. 2.

FIG. 3 is a flowchart for explaining the operation of the digital-watermark embedding device shown in FIG. 2. Hereinafter, the operation of the digital-watermark embedding device shown in FIG. 2 will be described with reference to the flowchart shown in FIG. 3.

First, a document image (original image 200) to which digital-watermark information is to be embedded is read through the image input unit 201 and is input to the region-segmentation unit 202 (step S301). The region-segmentation unit 202 segments the input document image into a plurality of attribute regions: a text region, a figure region, a graphic region, a table region, and so on (step S302).

Then, the circumscribed rectangle extracting unit 203 extracts circumscribed rectangles of letters included in the text region (step S303). A circumscribed rectangle of a letter is a rectangle circumscribing a letter, and is generally known as a region for recognizing a letter. In this embodiment, however, the circumscribed rectangle is used as a minimum unit to be operated for embedding digital-watermark information.

In order to extract the circumscribed rectangle, the following method may be used. For example, each pixel value of the document image is projected onto a vertical coordinate axis. Then, a blank part (part without a black letter) is searched for so as to determine lines, and the document image is divided into lines. Then, the document image is projected onto a horizontal coordinate axis in units of lines, blank part is searched for, and each line is divided into a letter unit. Accordingly, each letter can be recognized in a circumscribed rectangle.

Then, the watermark information embedding unit 207 embeds the digital-watermark information in the document image (step S304). Accordingly, a water-marked image 210 is generated (step S305).

Now, a process of embedding digital-watermark information by rotating a letter so as to change the inclination angle of the letter, the process being performed by the watermark information embedding unit 207, will be described.

Figure 4:
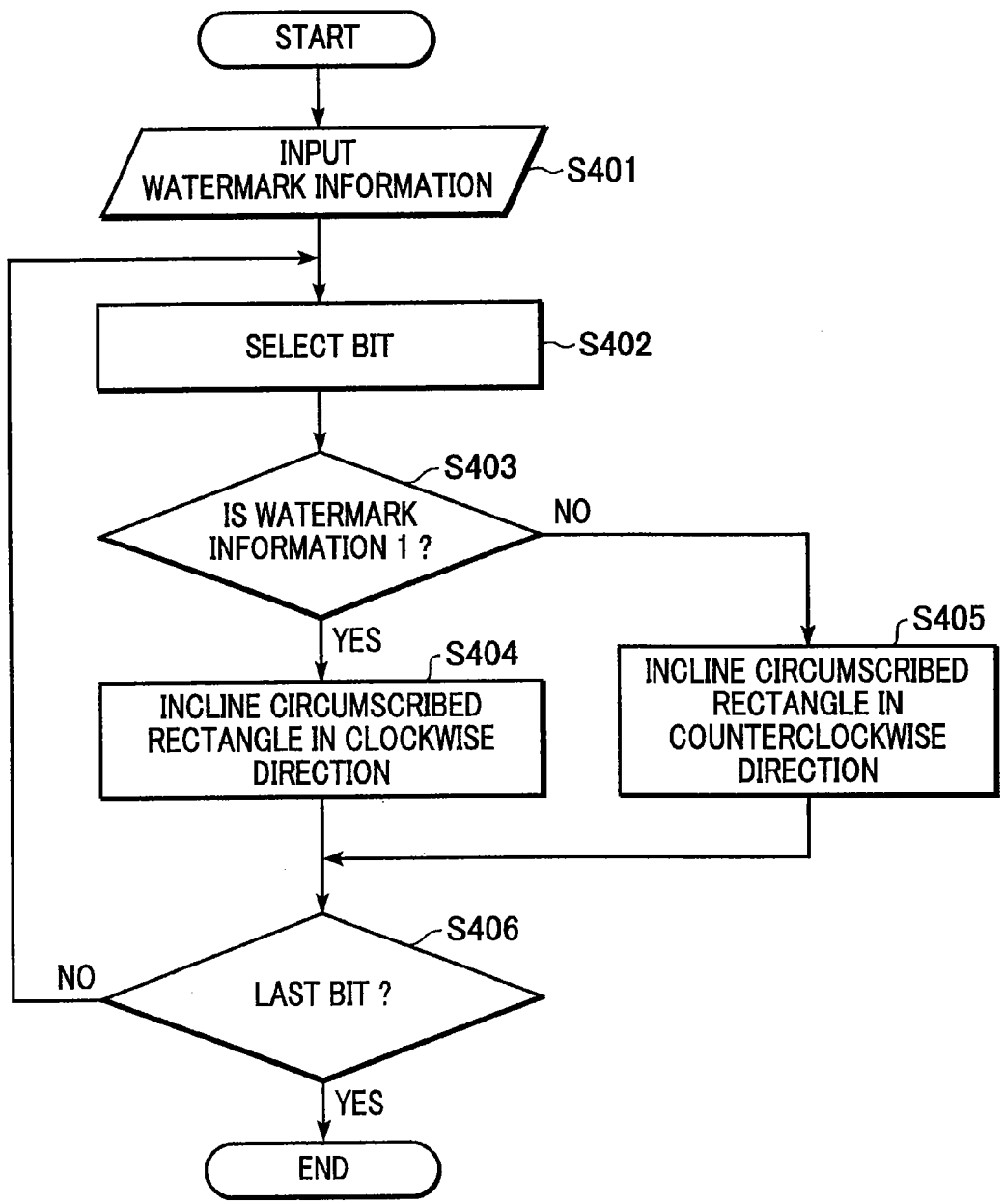
FIG. 4 is a flowchart showing a method of embedding digital-watermark by changing the inclination angle of a letter.

FIG. 4 is a flowchart for explaining the process. First, the digital-watermark information 204 to be embedded in the document image is input (step S401).

Then, a first letter to which the digital-watermark information 204 is to be embedded is selected in the document image (step S402).

Then, it is determined whether or not the bit of the digital-watermark information to be embedded is 1 (step S403). If the bit is 1 (YES in the flowchart), the letter is inclined in a clockwise direction (step S404). On the other hand, if the bit is 0 (NO in the flowchart), the letter is inclined in a counterclockwise direction (step S405).

In this embodiment, 1-bit information is embedded in a letter by determining a clockwise turn or a counterclockwise turn. However, the present invention is not limited to this method. In a modification, an absolute value of the inclination angle may be divided into a plurality of levels and different pieces of embedding information may be allocated to these levels. Specifically, it is regarded that 0 (counterclockwise) or 1 (clockwise) is embedded. Further, a threshold value is set in increments of 2 degrees from 2 to 20 degrees of the inclination angle, and it is regarded that the bit of embedded watermark information is increased by 1 bit as the inclination angle increases by 2 degrees. In this case, 1 to 10 bits may be embedded in a letter.

Then, it is determined whether or not the letter which is being processed is the last letter of the document (step S406). If the letter is the last letter (YES in the flowchart), the process of embedding digital-watermark information is completed. On the other hand, if the letter is not the last letter (NO in the flowchart), the process returns to step S402 so as to select a next letter.

The water-marked image 210 is output from the image output unit 209 (step S306). In this embodiment, output means printing of the image or storing the image data in a storage device or the like. Alternatively, the image data may be transmitted to another terminal through a network or the like.

By repeatedly embedding digital-watermark information in the document image, correct information can be extracted even when part of the digital-watermark information lacks or when error is caused. That is, robustness of the digital-watermark information can be increased.

As in the first embodiment, when digital-watermark information is embedded by inclining a letter, robustness to duplication of a water-marked image can be effectively increased by increasing rotation range $\delta\theta$ of a letter. However, the inclination angle of a letter becomes larger as the robustness is increased, and thus the appearance of the letter in the document image becomes unnatural. In the above-described algorithm of embedding digital-watermark information, a parameter determining the quality of image is the rotation range (inclination) of a letter. As the rotation range increases, robustness to duplication of a printed water-marked image increases, and/or the amount of information which can be embedded in the image advantageously increases. In that case, however, the document image looks unnatural, which is disadvantageous.

On the other hand, as the number of times a piece of digital-watermark information is embedded (repetition number) increases, reliability of extracting correct digital-watermark information increases. In that case, however, the amount of information which can be embedded in an image decreases disadvantageously. Herein, a parameter determining the robustness is indicated by the repetition number for clarity.

As described above, robustness to attack (embedding strength), image quality, and the amount of information are in tradeoff relationship.

In this embodiment, two other parameters which determine robustness to attack correspond to the rotation range of a letter and the repetition number of embedding desired digital-watermark information in a document image. The repetition number is the number of times a piece of digital-watermark information is embedded in a document image.

Herein, embedding strength is defined to be proportional to $f(n)$, which is obtained by normalizing the repetition number n of embedding. On the other hand, image quality is defined to be inversely proportional to $g(\delta\theta)$, which is obtained by normalizing the rotation range $\delta\theta$ of a letter.

In this embodiment, the repetition number n is at least 3. That is, when a piece of digital-watermark information is embedded in a document image less than three times, it is determined that the entire digital-watermark information has not been embedded. This is the minimum number for reliably extracting digital-watermark information.

Also, a maximum value of the rotation range of a letter is set so as to prevent unnatural appearance thereof, for example, is set to 20 degrees. Actually, a physical minimum value of the repetition number is 1, and a physical maximum value of the rotation range of a letter is 180 degrees. These values may be naturally applied.

Next, the processes of the two types of forced embedding modes of the present invention: robustness-priority forced embedding mode and image-quality-priority forced embedding mode, will be described.

(i) Robustness-priority Forced Embedding Mode

Figure 5:
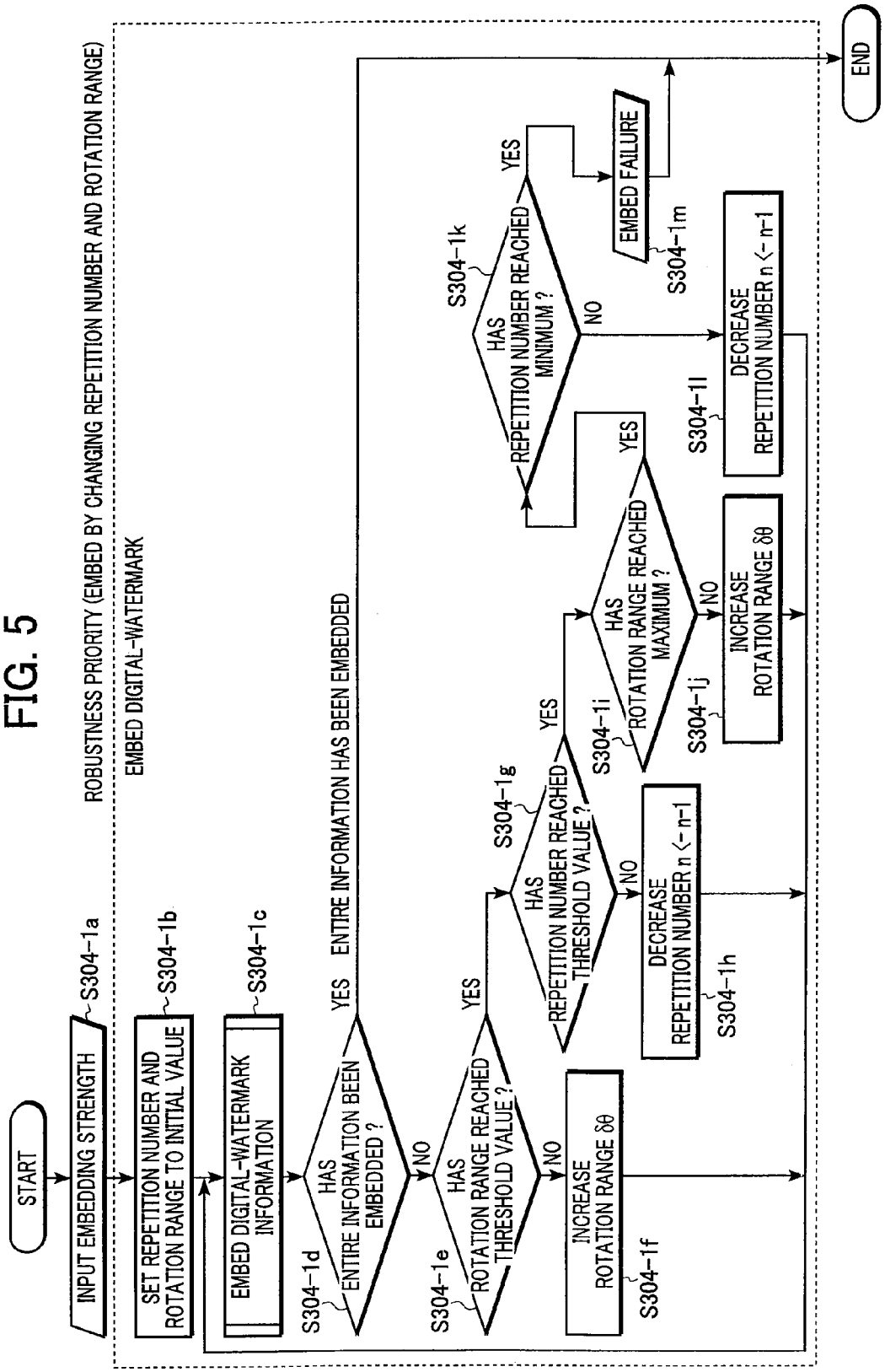
FIG. 5 is a flowchart showing a process in a robustness-priority forced embedding mode.

FIG. 5 is a flowchart showing a process performed when the robustness-priority forced embedding mode is selected. The process shown in FIG. 5 corresponds to a step of embedding digital-watermark information, that is, S304 in FIG. 3.

First, in step S304-1a, desired embedding strength is specified and is input to the device. Then, in step S304-1b, the repetition number and the rotation range are set to the initial values based on the embedding strength. Then, in step S304-1c, all letters to be processed in the document image 200 are rotated in order so as to embed the digital-watermark information therein. After the digital-watermark information has been embedded in all the letters, the process proceeds to step S304-1d.

In step S304-1d, it is checked whether or not the entire desired digital-watermark information 204 has been embedded in the document image 200. If the entire information has not been embedded (NO in the flowchart), the process proceeds to step S304-1e in order to embed the entire information in the document image.

Repetition of embedding, which will be described later, is restarted in a state that the previous embedding is regarded not to have been performed. That is, actually, digital-watermark information is embedded in the original document image based on a new parameter. Therefore, the previous digital-watermark information is not overwritten with new digital-watermark information.

In step S304-1e, it is determined whether or not the rotation range of a letter has reached a threshold value. If the rotation range has not reached the threshold value (NO in the flowchart), the process proceeds to step S304-1f.

In step S304-1f, since a high priority is given to robustness to attack in this mode, the rotation range of a letter is increased so as to degrade the image quality. Then, digital-watermark information is embedded again based on the newly set parameters (repetition number and rotation range). The above-described steps are repeatedly performed so as to embed the entire desired digital-watermark information.

Figure 6:
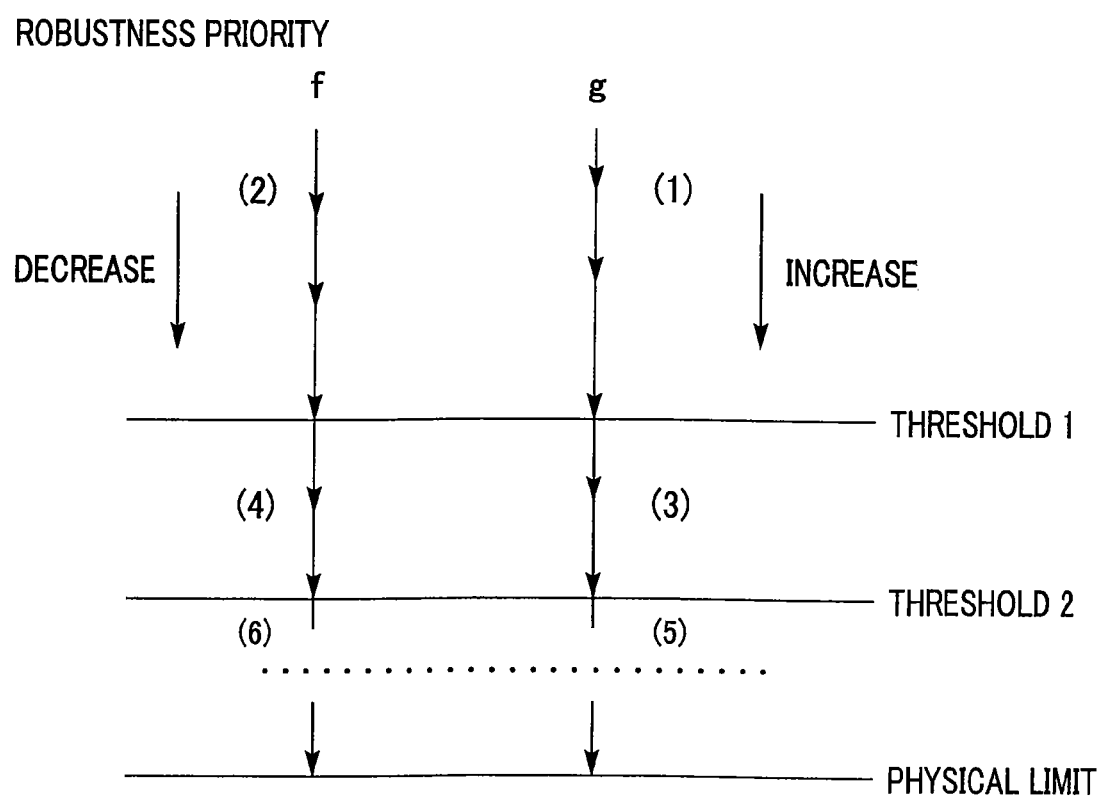
FIG. 6 shows a state of change in f(n) and g(δθ).

FIG. 6 shows the change in f(n) and g($\delta\theta$). Arrows in the figure indicate a state where the parameters of the repetition number (f) and the rotation range (g) change to an unfavorable state. That is, in FIG. 6, the arrow of the repetition number (f) indicates decrease, and the robustness to attack reduces in accordance with the decrease. On the other hand, the arrow of the rotation range (g) indicates increase, and the quality of the water-marked image is degraded in accordance with the increase.

Steps S304-1e and S304-1f correspond to stage (1) in FIG. 6. In stage (1), further degradation of the image quality (increase in rotation range) is allowed.

In step S304-1e, if the rotation range has reached Threshold 1 or Threshold 2 (YES in step S304-1e), a step of increasing the rotation range is stopped so as to try to decrease the repetition number.

At this time, in step S304-1g, it is determined whether or not the repetition number has reached the threshold value. If the repetition number has not reached the threshold value (NO in the flowchart), the process proceeds to step S304-1h, where the repetition number is decreased so as to increase the amount of information which can be embedded. The change in the parameter (repetition number) at this time corresponds to stage (2) in FIG. 6.

On the other hand, in step S304-1g, if the repetition number has reached the threshold value (YES in the flowchart), the process proceeds to step S304-1i, where it is determined whether or not the rotation range has reached the maximum. If the rotation range has not reached the maximum (NO in the flowchart), the process proceeds to step S304-1j, where the rotation range is increased again. The change in the parameter (rotation range) at this time corresponds to stage (3) in FIG. 6. In stage (3), the level of degradation of image quality is over Threshold 1, and thus the threshold value is changed so as to embed the entire digital-watermark information correctly.

On the other hand, in step S304-1i, if the rotation range has reached the maximum of 180 degrees (YES in the flowchart), the process proceeds to step S304-1k, where it is determined whether or not the repetition number has reached the minimum of 1. If the repetition number has not reached the minimum (NO in the flowchart), the process proceeds to step S304-1l, where the repetition number is reduced again. The change in the parameter (repetition number) at this time corresponds to stage (4) in FIG. 6. On the other hand, if the repetition number has reached the minimum (YES in the flowchart), the process of embedding the digital-watermark information cannot be continued any more (correct information cannot be embedded). Thus, the process proceeds to step S304-1m, where it is determined that embedding ended in failure, so as to stop the embedding process.

(ii) Image-quality-priority Forced Embedding Mode

Next, an embedding process performed when the image-quality-priority forced embedding mode is selected will be described.

Figure 7:
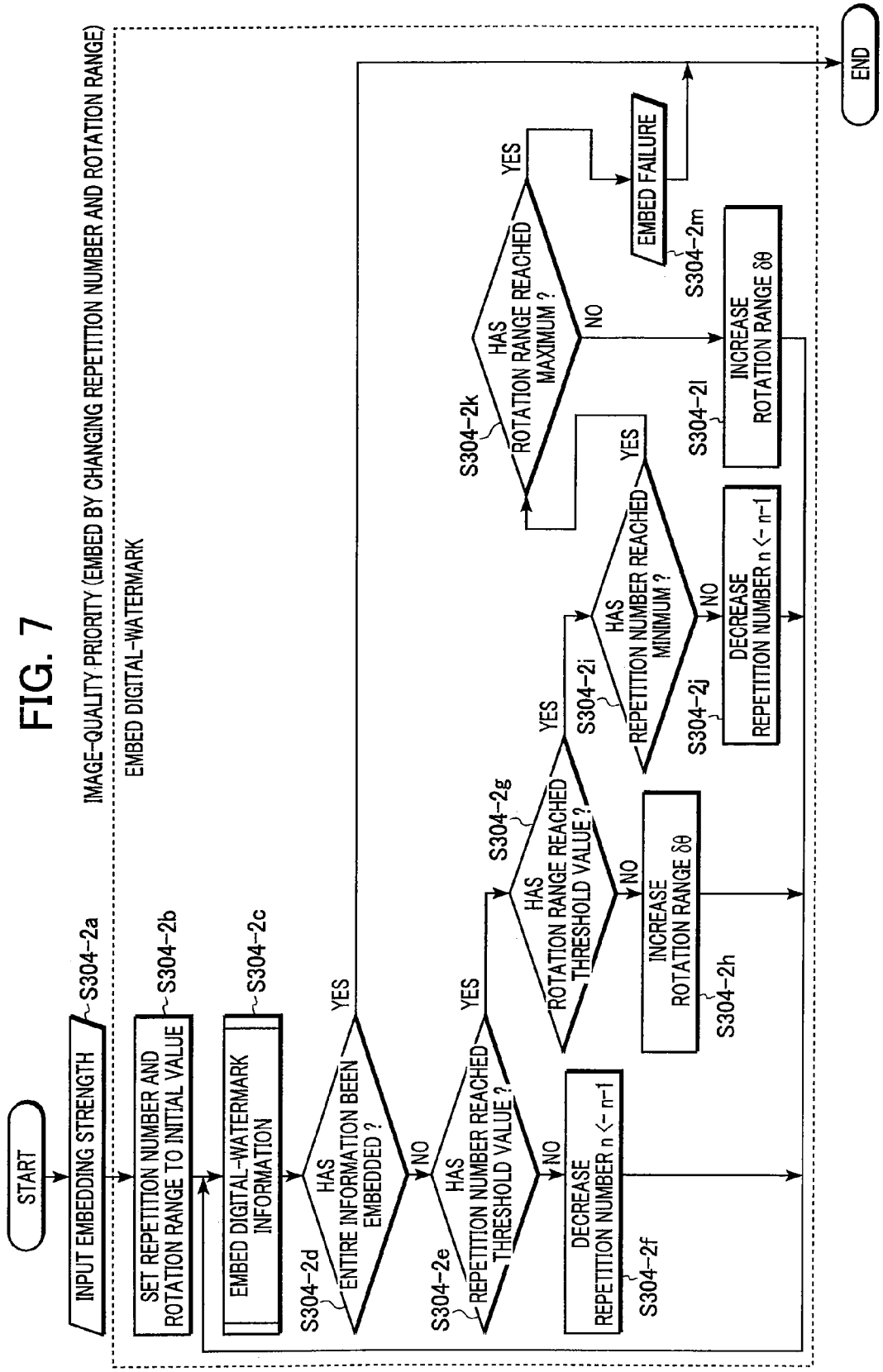
FIG. 7 is a flowchart showing a process in an image-quality-priority forced embedding mode.

FIG. 7 is a flowchart showing a process performed when the image-quality-priority forced embedding mode is selected.

First, in step S304-2a, desired embedding strength is specified and is input to the device. Then, in step S304-2b, the repetition number and the rotation range are set to the initial values based on the embedding strength. Then, in step S304-2c, all letters to be processed in the document image 200 are rotated in order so as to embed the digital-watermark information therein. After digital-watermark information has been embedded in all the letters, the process proceeds to step S304-2d.

In step S304-2d, it is checked whether or not the entire desired digital-watermark information 204 has been embedded in the document image 200. If the entire information has not been embedded (NO in the flowchart), the process proceeds to step S304-2e in order to embed the entire information in the document image. Then, a process of correctly embedding the digital-watermark information is performed in accordance with the following steps.

Figure 8:
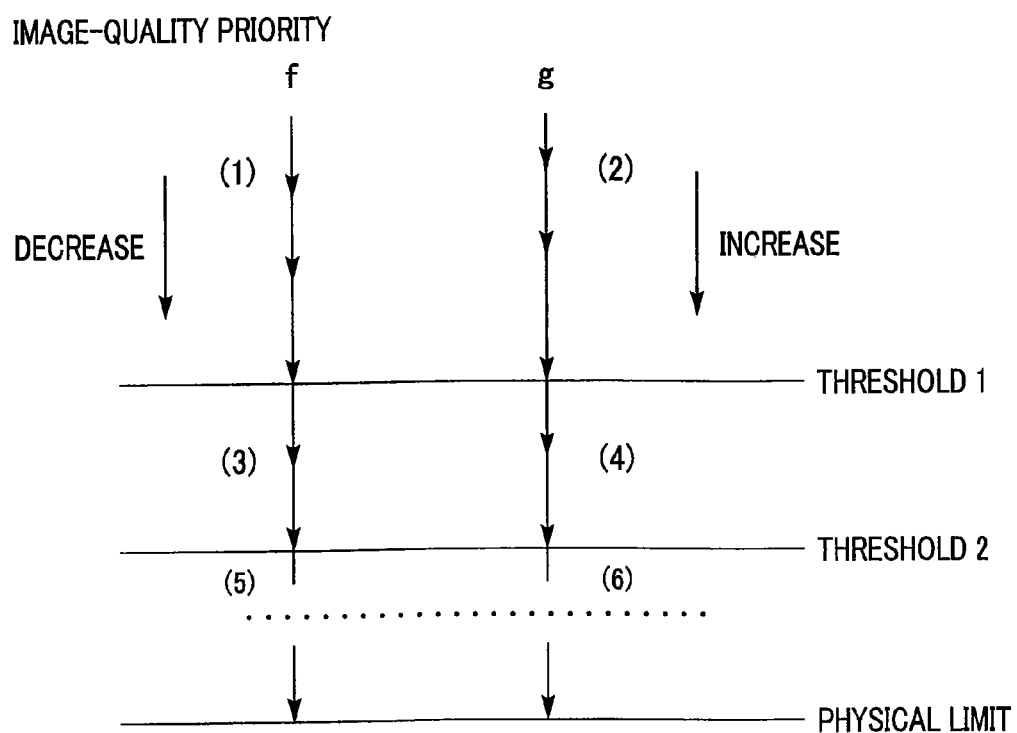
FIG. 8 shows change in parameters in the image-quality-priority forced embedding mode.

FIG. 8 shows the change in f(n) and g($\delta\theta$) in the image-quality-priority forced embedding mode. Arrows in the figure indicate a state where the parameters of the repetition number (f) and the rotation range (g) changes to an unfavorable state. The system of FIG. 8 is the same as that of FIG. 6, and thus a detailed description is omitted.

In step S304-2e, it is determined whether or not the repetition number has reached the threshold value. If the repetition number has not reached the threshold value (NO in the flowchart), the process proceeds to step S304-2f, where the repetition number is reduced. The change in the parameter (repetition number) at this time corresponds to stage (1) in FIG. 8. Herein, since the image-quality-priority mode is selected, reduction of robustness to attack is allowed to some extent, and increase in the rotation range is suppressed. On the other hand, in step S304-2e, if the repetition number has reached the threshold value (YES in the flowchart), a step of decreasing the repetition number is suspended.

Then, in step S304-2g, it is determined whether or not the rotation range has reached the threshold value. If the rotation range has not reached the threshold value (NO in the flowchart), the process proceeds to step S304-2h, where the rotation range is increased so as to increase the amount of digital-watermark information which can be embedded. The change in the parameter (rotation range) at this time corresponds to stage (2) in FIG. 8.

On the other hand, if the rotation range has reached Threshold 1 (YES in the flowchart), degradation of the image quality has reached a first-stage limit, and thus the process proceeds to step S304-2i, where it is determined whether or not the repetition number has reached the minimum. If the repetition number has not reached the minimum (NO in the flowchart), the process proceeds to step S304-2j, where the repetition number is decreased again so as to try to increase the amount of digital-watermark information which can be embedded. The change in the parameter (repetition number) at this time corresponds to stage (3) in FIG. 8.

On the other hand, in step S304-2i, if the repetition number has reached the minimum (YES in the flowchart), the process proceeds to step S304-2k, where it is determined whether or not the rotation range has reached the maximum. If the rotation range has not reached the maximum (NO in the flowchart), the process proceeds to step S304-2l, where the rotation range is increased so as to try to increase the amount of digital-watermark information which can be embedded. The change in the parameter at this time corresponds to stage (4) in FIG. 8.

On the other hand, in step S304-2k, if the rotation range has reached the maximum (YES in the flowchart), the process of embedding the digital-watermark information cannot be continued any more (correct information cannot be embedded). Thus, the process proceeds to step S304-2m, where it is determined that embedding ended in failure, so as to stop the embedding process.

As described above, in the robustness-priority embedding mode, degradation of image quality is controlled first in order to embed a desired amount of digital-watermark information. When stepwise degradation is required, the parameter group is changed in the following order: degrade image quality to a first threshold (1), reduce robustness to a first threshold (2), degrade image quality to a second threshold (3), reduce robustness to a second threshold (4), degrade image quality to a third threshold (5), reduce robustness to a third threshold (6), . . . .

On the other hand, in the image-quality-priority embedding mode, degradation of robustness to attack is controlled first in order to embed a desired amount of digital-watermark information. When stepwise degradation is required, the parameter group is changed in the following order: reduce robustness to a first threshold (1), degrade image quality to a first threshold (2), reduce robustness to a second threshold (3), degrade image quality to a second threshold (4), reduce robustness to a third threshold (5), degrade image quality to a third threshold (6) . . . .

Second Embodiment

In the first embodiment, the repetition number is regarded as a first parameter determining robustness to attack. However, another value may be regarded as the first parameter determining robustness to attack. In the second embodiment, information to be embedded is encoded with an error-correction code in a process of embedding digital-watermark information by changing the inclination angle of a letter.

When digital-watermark information is embedded in a document image, encoding with an error-correction code can be adopted in order to strengthen the robustness to attack on the digital-watermark information. In the second embodiment, error-correction ability in the error-correction encoding is regarded as the first parameter determining the robustness to attack. The second parameter determining image quality is the rotation range, as in the first embodiment.

The possibility of correctly extracting and recognizing digital-watermark information increases and robustness to attack is improved as the error-correction ability of the error-correction code becomes higher. On the other hand, when digital-watermark information is encoded into a code having high error-correction ability, the code length increases, and thus the amount of digital-watermark information which can be embedded substantially decreases. This principle is the same as in the repetition number in the first embodiment.

In the first embodiment, only the repetition number is regarded as the first parameter for clarity. However, as described in the first embodiment, robustness to attack does not always depend only on a single parameter. For example, robustness to attack may also depend on error-correction ability and rotation range of a letter. Therefore, various factors may be regarded as a parameter which determines degradation of each of robustness to attack and image quality.

In this embodiment, embedding strength (robustness to attack) is represented by multiplying f(t) obtained by normalizing error-correction ability t by g(δθ) obtained by normalizing the rotation range δθ. That is, the following equation is obtained:

$$\text{Strength} = f(t) \times g(\delta\theta) \qquad \text{equation (1)}.$$

In this embodiment, in order to embed digital-watermark information having some robustness to attack, t and δθ are set to values so that the Strength can be obtained. Herein, a threshold value defining the tolerance of error-correction ability is set to 1, and a physical limit is set to 0. The rotation range of a letter is the same as in the first embodiment.

(iii) Robustness-priority Forced Embedding Mode

Figure 9:
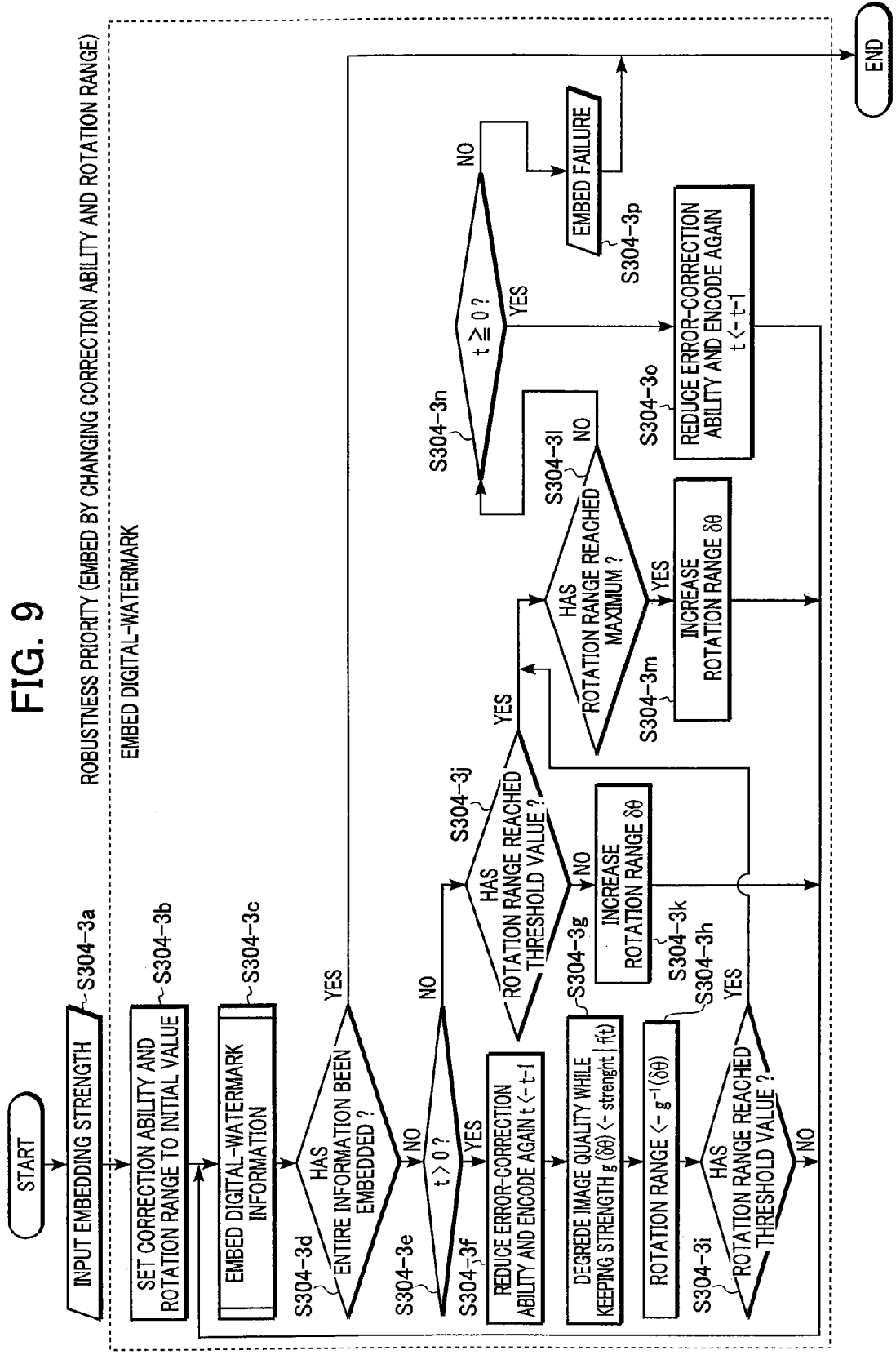
FIG. 9 is a flowchart showing a process in the robustness-priority forced embedding mode.

First, the robustness-priority forced embedding mode will be described. FIG. 9 is a flowchart for explaining an embedding process performed when the robustness-priority forced embedding mode is selected. In the second embodiment, the step of changing the repetition number in FIG. 5 is replaced by a step of changing the error-correction ability of an error-correction code, and the above-described embedding strength is applied. Hereinafter, part different from the first embodiment is mainly explained. Steps S304-3a to S304-3d are the same as in FIGS. 5 and 7.

In step S304-3e, it is determined whether or not the error-correction ability t is more than 0. If the error-correction ability t is more than 0 (YES in the flowchart), the process proceeds to step S304-3f, where the error-correction ability is reduced and the code length obtained after error-correction encoding is reduced, so as to increase the amount of digital-watermark information which can be embedded.

Since a priority is given to robustness, δθ is obtained based on the following equation:

$$\delta\theta = g^{-1}(\text{Strength}/f(t)) \qquad \text{equation (2)}$$

so that the substantial robustness becomes equal to specified strength. In this way, the tolerance of rotation range of a letter is set large (steps S304-3g and S304-3h).

Then, in step S304-3i, it is determined whether or not the rotation range has reached the threshold value. If the rotation range has not reached the threshold value (NO in the flowchart), the process returns to step S304-3c, where digital-watermark information is embedded again based on a newly set parameter. Then, the above-described steps are repeatedly performed so as to correctly embed the entire digital-watermark information. If the rotation range has reached the threshold value (YES in the flowchart), the process proceeds to step S304-3*l*.

Figure 10:
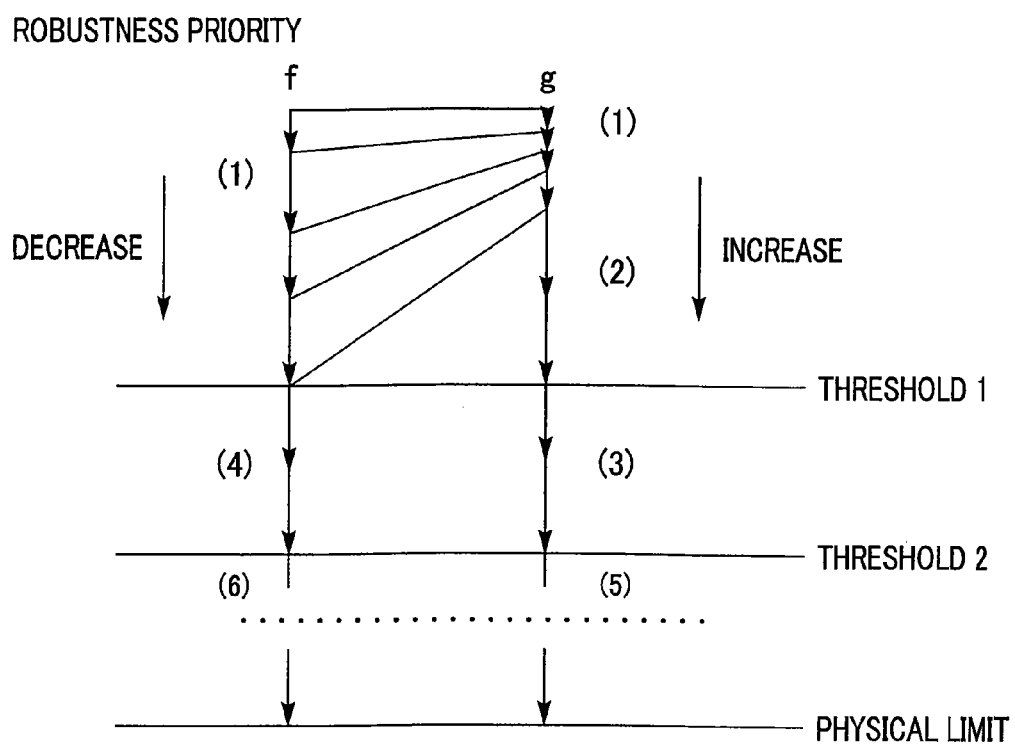
FIG. 10 shows a state of change in f and g.

FIG. 10 shows the change in the error-correction ability (f) and the rotation range (g). Arrows in the figure indicate a state where the parameters of the error-correction ability (f) and the rotation range (g) change to an unfavorable state. The system of FIG. 10 is the same as that of FIG. 6. A feature in FIG. 10 is that, in a first stage (1) of adjusting the parameters, the parameters (f and g) are changed so that the robustness (strength) to attack is kept constant. Another feature is that the parameter g is continuously increased in the transition from stage (2) to stage (3).

In step S304-3*d*, it is checked whether or not the entire desired digital-watermark information 204 has been embedded in the document image 200. If the entire information has not been embedded (NO in the flowchart), the process proceeds to step S304-3*e* so as to embed the entire digital-watermark information in the document image in accordance with the following steps.

In step S304-3*e*, if the error-correction ability has reached the threshold value (NO in the flowchart), the process of reducing the error-correction ability of the error-correction code is stopped and the process proceeds to step S304-3*j*. In step S304-3*j*, it is determined whether or not the rotation range has reached the threshold value.

In step S304-3*j*, if the rotation range has not reached the threshold value (NO in the flowchart), the process proceeds to step S304-3*k*, where the tolerance of rotation range is increased so as to increase the amount of digital-watermark information which can be embedded. The change in the parameter (rotation range) at this time corresponds to stage (2) in FIG. 10.

In step S304-3*j*, if the tolerance of rotation range has reached the threshold value, the process proceeds to step S304-3*l*. In step S304-3*l*, it is determined whether or not the rotation range has reached the maximum. If the rotation range has reached the maximum, the process proceeds to step S304-3*m*, where the tolerance of rotation range is increased so as to increase the amount of digital-watermark information which can be embedded. The change in the parameter (rotation range) at his time corresponds to stage (3) in FIG. 10.

The error-correction ability is reduced in stage (4), the rotation range is increased in stage (5), and the error-correction ability is reduced again in stage (6). Such a switching operation is the same as in the first embodiment.

(iv) Image-quality-priority Forced Embedding Mode

Figure 11:
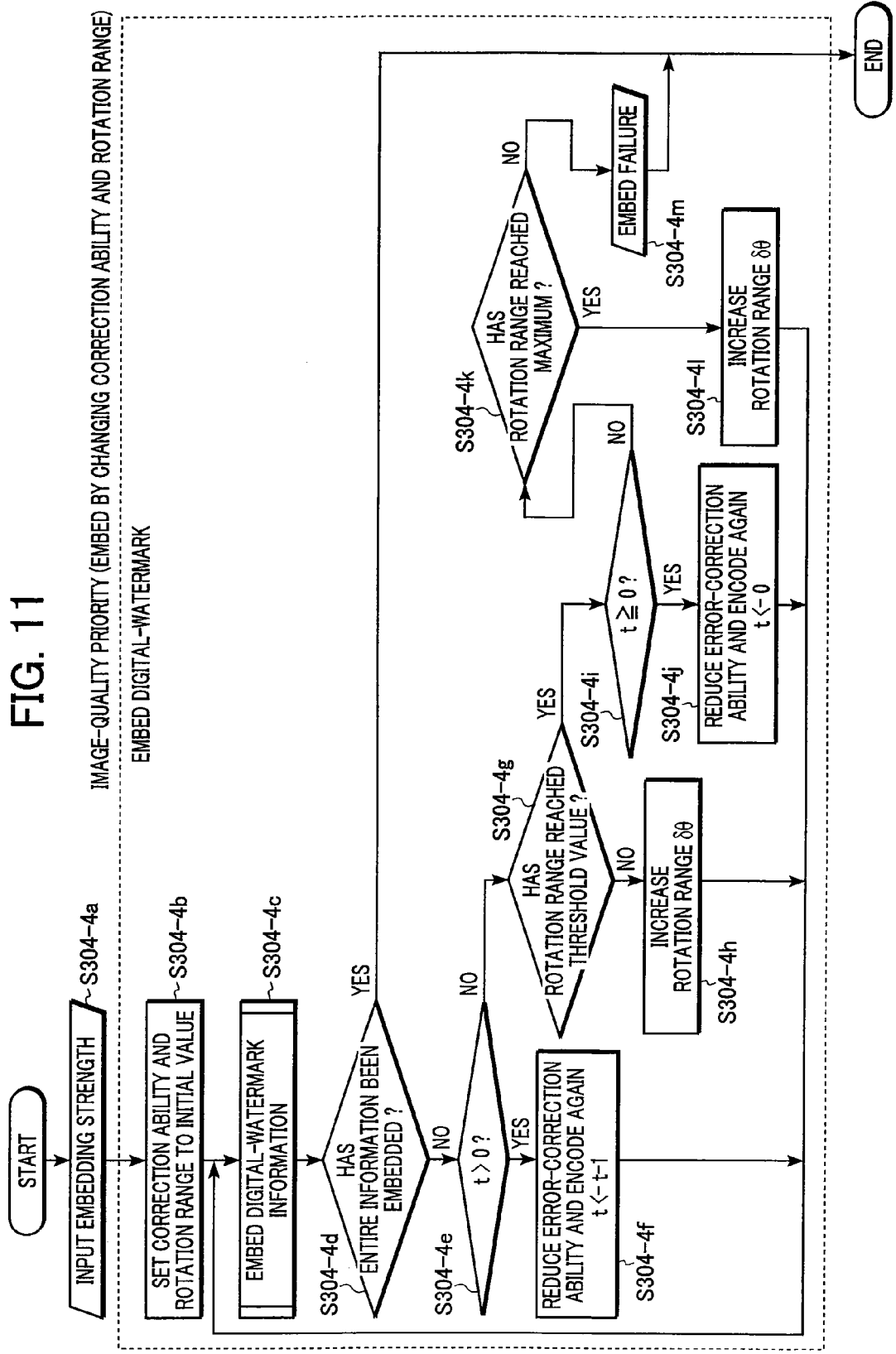
FIG. 11 is a flowchart showing a process in the image-quality-priority forced embedding mode.

The process in the image-quality-priority forced embedding mode is shown in FIG. 11. In this process, error-correction ability is regarded as the first parameter, which corresponds to the repetition number in FIG. 7. Therefore, the corresponding description will be omitted.

Third Embodiment

In the above-described embodiments, it is provided that the letters included in the document image to which digital-watermark information is embedded is included in a page. However, the document image often includes a plurality of pages. In the third embodiment, digital-watermark information is embedded in a plurality of pages, in addition to the processes of reducing the repetition number and the error-correction ability.

Figure 12:
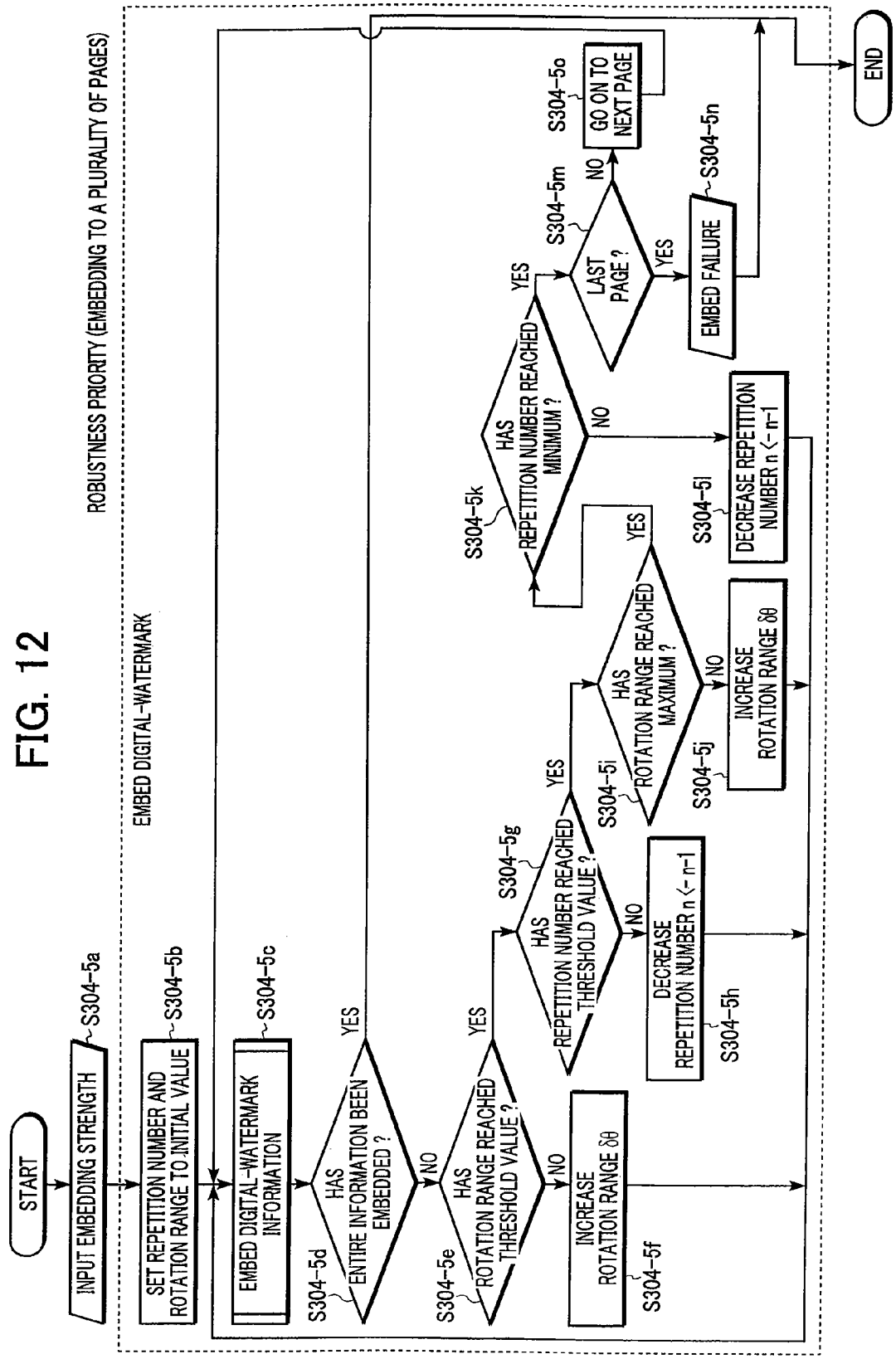
FIG. 12 is a flowchart showing an operation of a digital-watermark embedding device having a function of changing pages of document image in which digital-watermark information is to be embedded.
Figure 13:
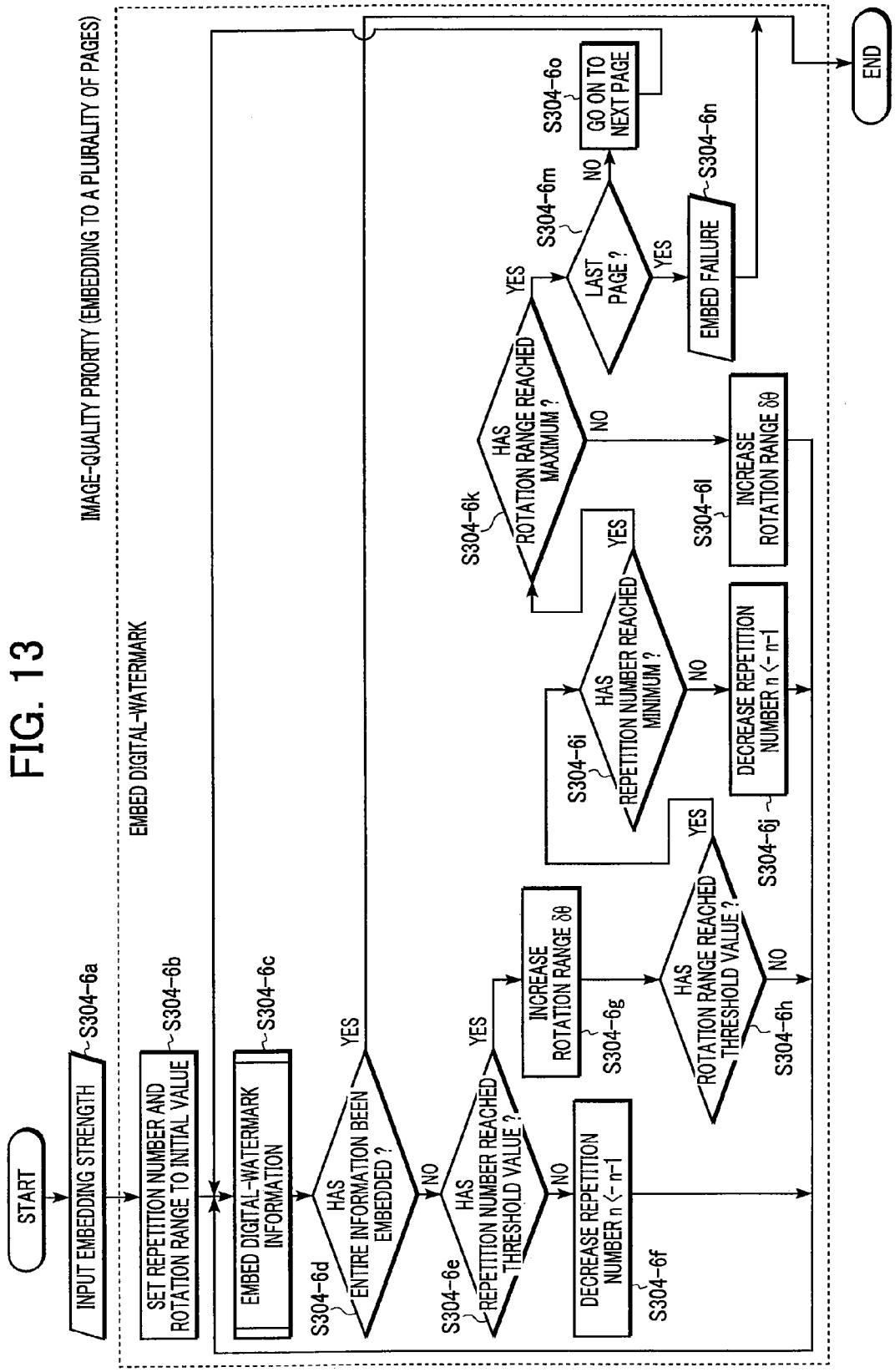
FIG. 13 is a flowchart showing an operation of the digital-watermark embedding device having a function of changing pages of document image in which digital-watermark information is embedded.

FIGS. 12 and 13 show the operations of the third embodiment. In the processes shown in these figures, a step of setting a page to which digital-watermark information is embedded to a next page is performed when it is determined that the repetition number has reached the minimum (step S304-1*k* in FIG. 5) in the embedding process of the first embodiment. FIG. 12 shows a process of the robustness-priority forced embedding mode as in FIG. 5, and the process shown in FIG. 12 is the same as that in FIG. 5, except that a next page may exist in FIG. 12. FIG. 13 shows a process of the image-quality-priority forced embedding mode as in FIG. 7, and the process shown in FIG. 13 is the same as that in FIG. 7, except that a next page may exist in FIG. 13. Hereinafter, both processes are described briefly.

In step S304-5*k* in FIG. 12, it is determined whether or not the repetition number has reached the minimum. If the repetition number has reached the minimum (YES in the flowchart), the process proceeds to step S304-5*m*, where it is determined whether or not the page which is being processed is the last page. If a next page exist (NO in the flowchart), the process proceeds to step S304-5*o*, where the page to which digital-watermark information is to be embedded is changed to the next page. Then, the step of embedding digital-watermark information is performed again. If a next page does not exist (YES in the flowchart), the process of embedding digital-watermark information is ended in failure (step S304-5*n*).

In step S304-6*k* in FIG. 13, it is determined whether or not the rotation range has reached the maximum. If the rotation range has reached the maximum (YES in the flowchart), the process proceeds to step S304-6*m*, where it is determined whether or not the page which is being processed is the last page. If a next page exist (NO in the flowchart), the process proceeds to step S304-6*o*, where the page to which digital-watermark information is to be embedded is changed to the next page. Then, the step of embedding digital-watermark information is performed again. If a next page does not exist (YES in the flowchart) in step S304-6*m*, the process of embedding digital-watermark information is ended in failure (step S304-6*n*).

In this embodiment, a problem of a document image, that is, the number of letters in which digital-watermark information is to be embedded is limited, can be solved by forming the document image with a plurality of pages.

Fourth Embodiment

The embedding strength (robustness to attack) in the first embodiment can be associated with each parameter, as in the second embodiment. At this time, the error-correction ability t in the equations (1) and (2) in the second embodiment is replaced by the repetition number n.

It is also possible to define that the embedding strength in the second embodiment depends only on f, which is obtained by normalizing the repetition number n, as in the first embodiment.

In the above-described embodiments, digital-watermark information is embedded by rotating a letter, but another method may be used. For example, digital-watermark information may be embedded by changing a space between letters. Hereinafter, this embedding method will be described.

Figure 14:
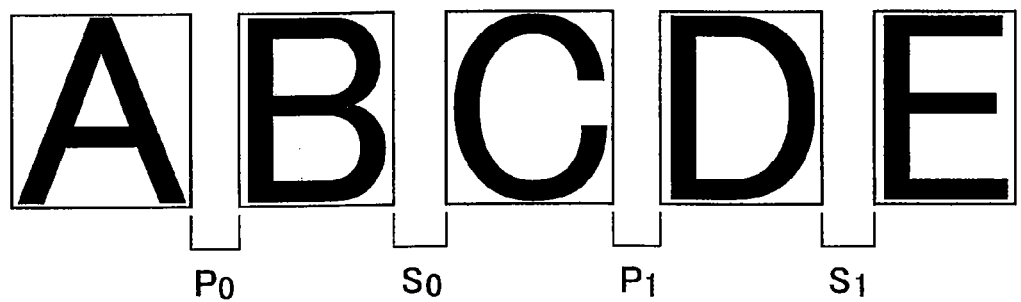
FIG. 14 shows part of document image before digital-watermark information is embedded therein.
Figure 15:
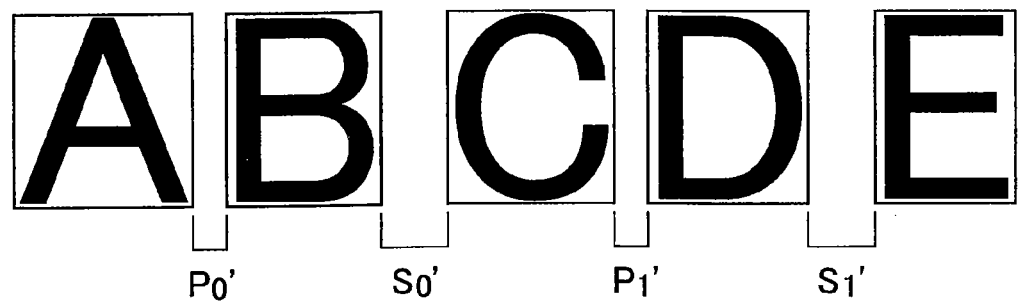
FIG. 15 shows part of document image after digital-watermark information is embedded therein.

FIG. 14 shows part of a document image which has not been water-marked. FIG. 15 shows part of a document image obtained by water-marking the document image shown in FIG. 14. In FIG. 14, $P_0$, $S_0$, $P_1$, and $S_1$ are values indicating the lengths of spaces between the letters. $P_0$, $S_0$, $P_1$, and $S_1$ in FIG. 14 are adjusted based on a predetermined rule in order to embed digital-watermark information, so as to be $P_0'$, $S_0'$, $P_1'$, and $S_1'$ in FIG. 15.

In FIGS. 14 and 15, five letters and four spaces are provided. In this embodiment, two space-lengths $P_n$ and $S_n$ are used for embedding 1-bit digital-watermark information. Thus, 2-bit digital-watermark information can be embedded by using four spaces $P_0$, $S_0$, $P_1$, and $S_1$. In this embodiment, $P_n > S_n$ indicates 1 and $P_n < S_n$ indicates 0.

In FIG. 14, when the letter between $P_0$ and $S_0$ is shifted to the left and when the letter between $P_1$ and $S_1$ is shifted to the left, $P_0' < S_0'$ and $P_1' < S_1'$, as shown in FIG. 15. In this case, 2-bit digital-watermark information "0,0" has been embedded.

On the other hand, when the letter between $P_0$ and $S_0$ is shifted to the left and when the letter between $P_1$ and $S_1$ is shifted to the right, $P_0' < S_0'$ and $P_1' > S_1'$ in FIG. 15. In this case, 2-bit digital-watermark information "0,1" has been embedded.

In this embodiment, movement amount x of a letter is used instead of the rotation amount θ of a letter in the first to third embodiments. Accordingly, the first parameter corresponds to the repetition number or the error-correction ability as in the first to third embodiments, and the second parameter corresponds to the movement range of each letter.

Fifth Embodiment

Figure 16:
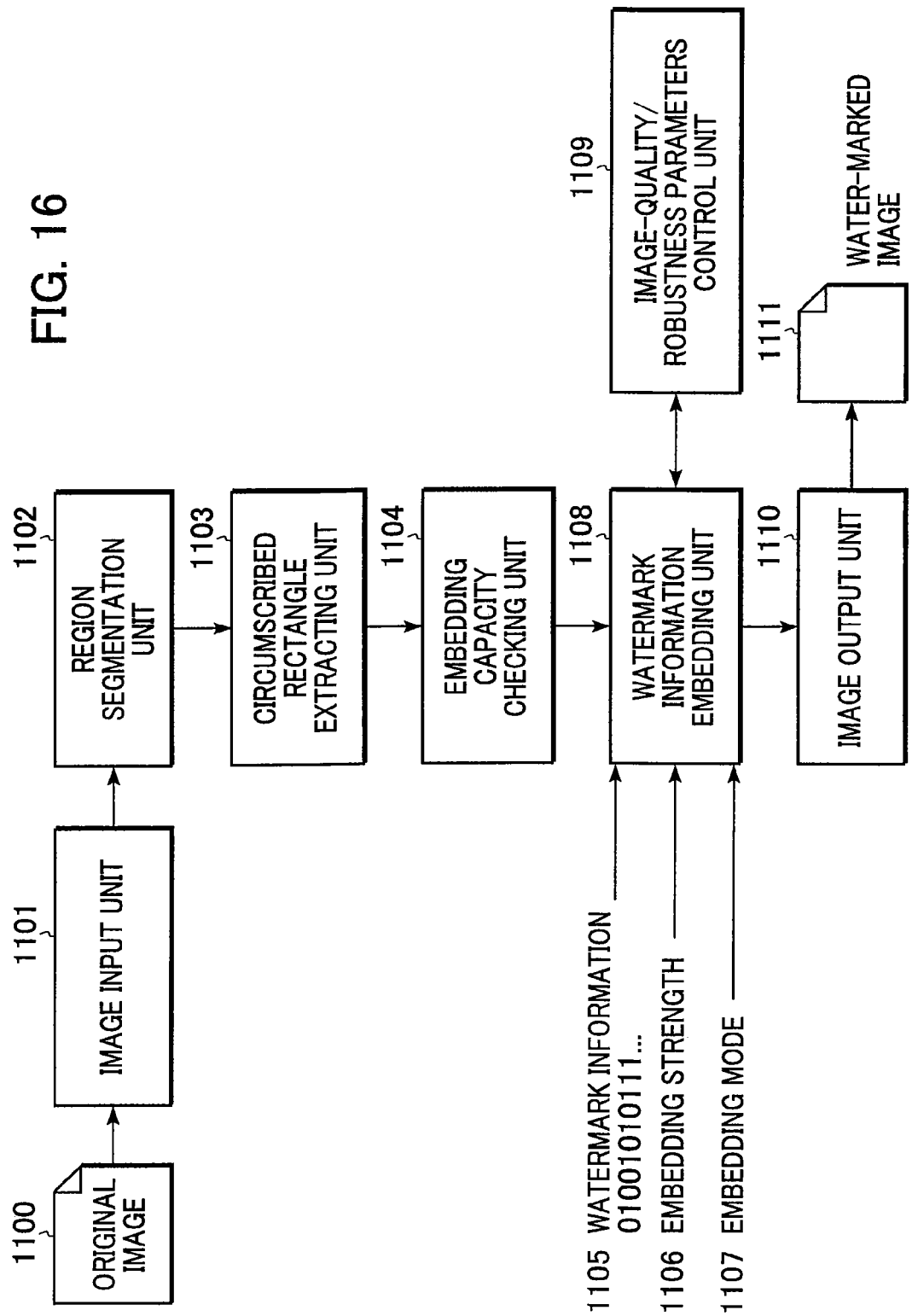
FIG. 16 shows the configuration of a digital-watermark embedding device according to a fifth embodiment.
Figure 17:
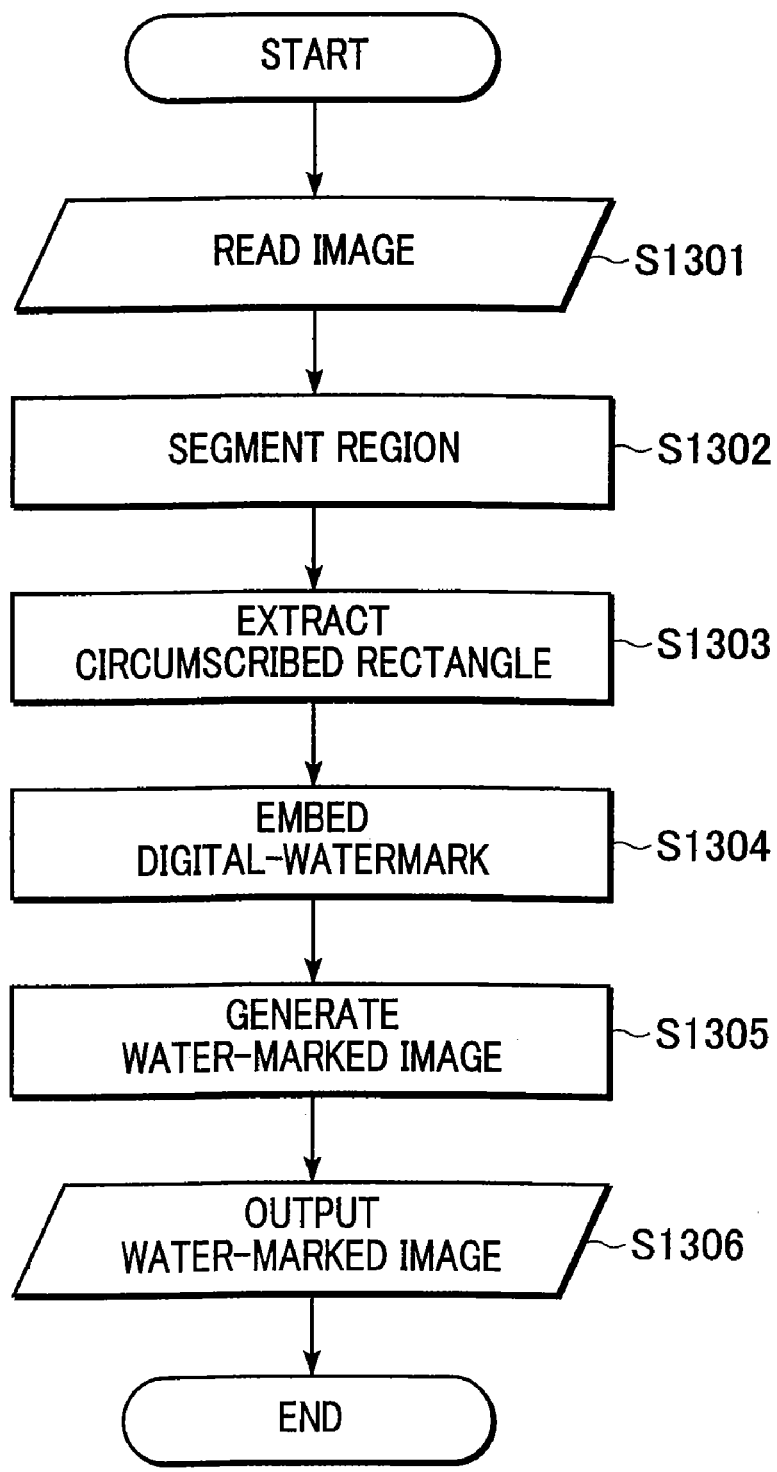
FIG. 17 is a flowchart of an operation of the digital-watermark embedding device shown in FIG. 16.

FIG. 16 shows the configuration of a digital-watermark embedding device according to a fifth embodiment, and FIG. 17 shows the operation of the device shown in FIG. 16. Hereinafter, the function and operation of each unit of this embodiment will be described with reference to FIGS. 16 and 17.

First, a document image (original image 1100) in which digital-watermark information is to be embedded is read through an image input unit 1101 and is input to a region-segmentation unit 1102 (step S1301). The region-segmentation unit 1102 segments the input document image into a plurality of attribute regions: a text region, a figure region, a graphic region, a table region, and so on (step S1302).

A circumscribed rectangle extracting unit 1103 extracts circumscribed rectangles of the letters included in the text region (step S1303). A circumscribed rectangle of a letter is a rectangle circumscribing a letter, and is generally known as a region for recognizing a letter. In this embodiment, however, the circumscribed rectangle is used as a minimum unit to be operated for embedding digital-watermark information. A method of extracting the circumscribed rectangle has been described above.

Figure 18:
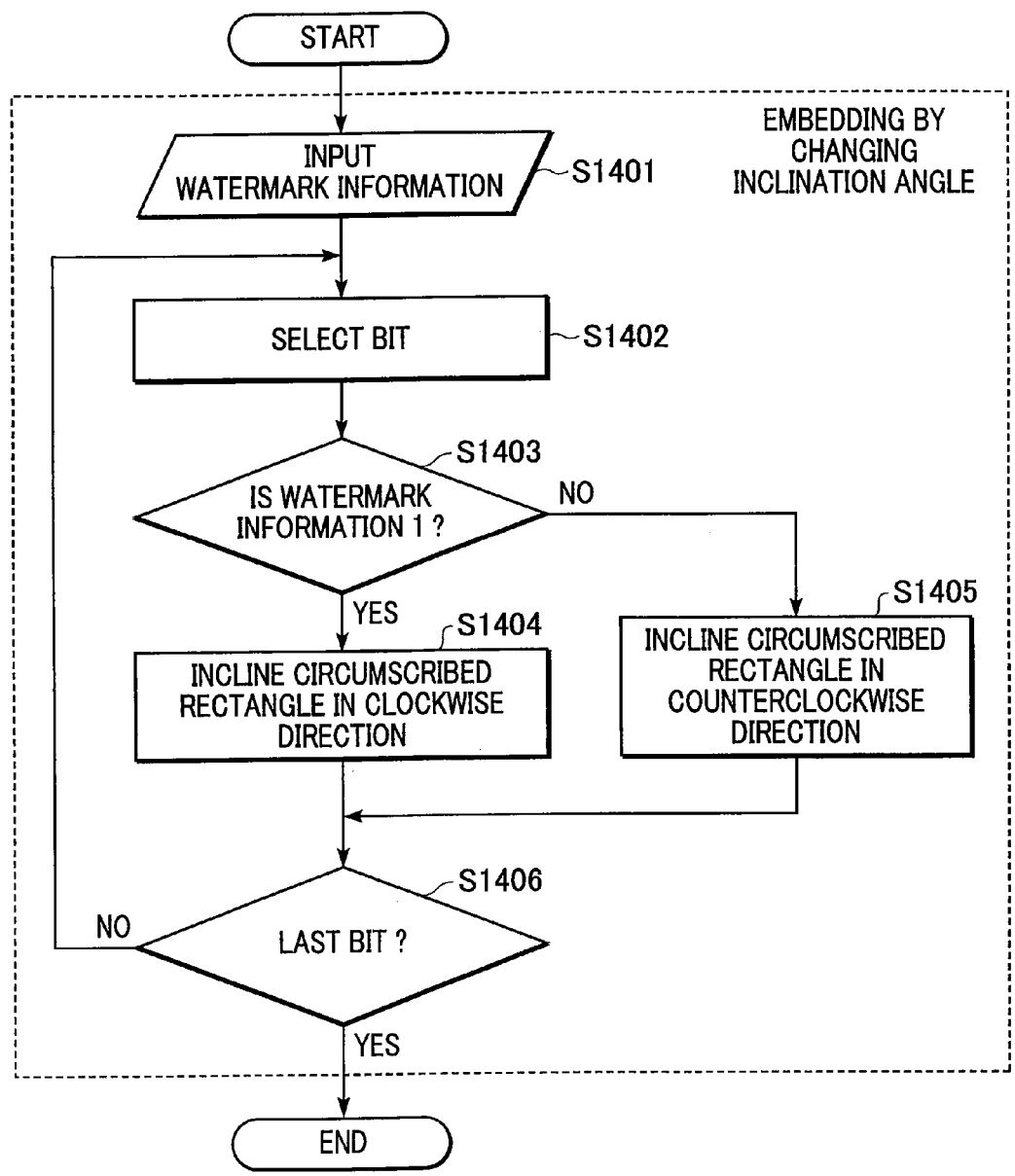
FIG. 18 is a flowchart showing a method of embedding digital-watermark by changing the inclination angle of a letter.

Now, a digital-watermark information embedding method performed by a watermark information embedding unit 1108 is described. FIG. 18 shows a process of embedding digital-watermark information by changing the inclination angle of a letter. First, digital-watermark information to be embedded is input (step S1401). Then, the first letter in which digital-watermark information is embedded is selected (step S1402). Then, it is determined whether or not the bit of the digital-watermark information to be embedded is 1 (step S1403). If the bit is 1 (YES in the flowchart), the letter is inclined in a clockwise direction (step S1404). On the other hand, if the bit is 0 (NO in the flowchart), the letter is inclined in a counterclockwise direction (step S1405). The embedding information can be increased in accordance with the absolute value of the inclination angle. For example, 0 or 1 is determined according to counterclockwise or clockwise. In this case, a threshold value is set in increments of 2 degrees from 2 to 20 degrees of the inclination angle, and 10 bits may be embedded in a letter. The above description is basically the same as in the first embodiment.

Then, it is determined whether or not the letter is the last letter of the document (step S1406). If the letter is the last letter (YES in the flowchart), the process of embedding digital-watermark information is completed. On the other hand, if the letter is not the last letter (NO in the flowchart), the process returns to step S1402 so as to select a next letter. The water-marked image is output from the image output unit 1110 (step S1306). The output image may be printed out or may be stored in a storage device or the like in the form of image data. Alternatively, the image data may be transmitted to another terminal through a network or the like.

By repeatedly embedding digital-watermark information in the document image, correct information can be extracted even when part of the digital-watermark information lacks or when error is caused. That is, robustness can be increased.

As in this embodiment, when digital-watermark information is embedded by inclining a letter, robustness to duplication of a water-marked image can be effectively increased by increasing a letter rotation range δθ. However, the inclination angle of a letter becomes larger as the robustness is increased, and thus the appearance of the letter in the document image becomes unnatural. In the above-described algorithm of embedding digital-watermark information, a parameter determining the quality of image is the rotation range (inclination) of a letter. As the rotation range increases, robustness to duplication of a printed water-marked image increases, and/or the amount of information which can be embedded in the image advantageously increases. In that case, however, the document image looks unnatural, which is disadvantageous.

On the other hand, as the number of times a piece of digital-watermark information is embedded (repetition number) increases, reliability of extracting correct digital-watermark information increases. In that case, however, the amount of information which can be embedded in an image decreases disadvantageously. Herein, a parameter determining the robustness corresponds only to the repetition number for clarity.

Herein, embedding strength is indicated by an integer from 1 to 10 for user's intuitive understanding. This range may be changed, and continuous values may be used instead of discrete values.

Figure 19:
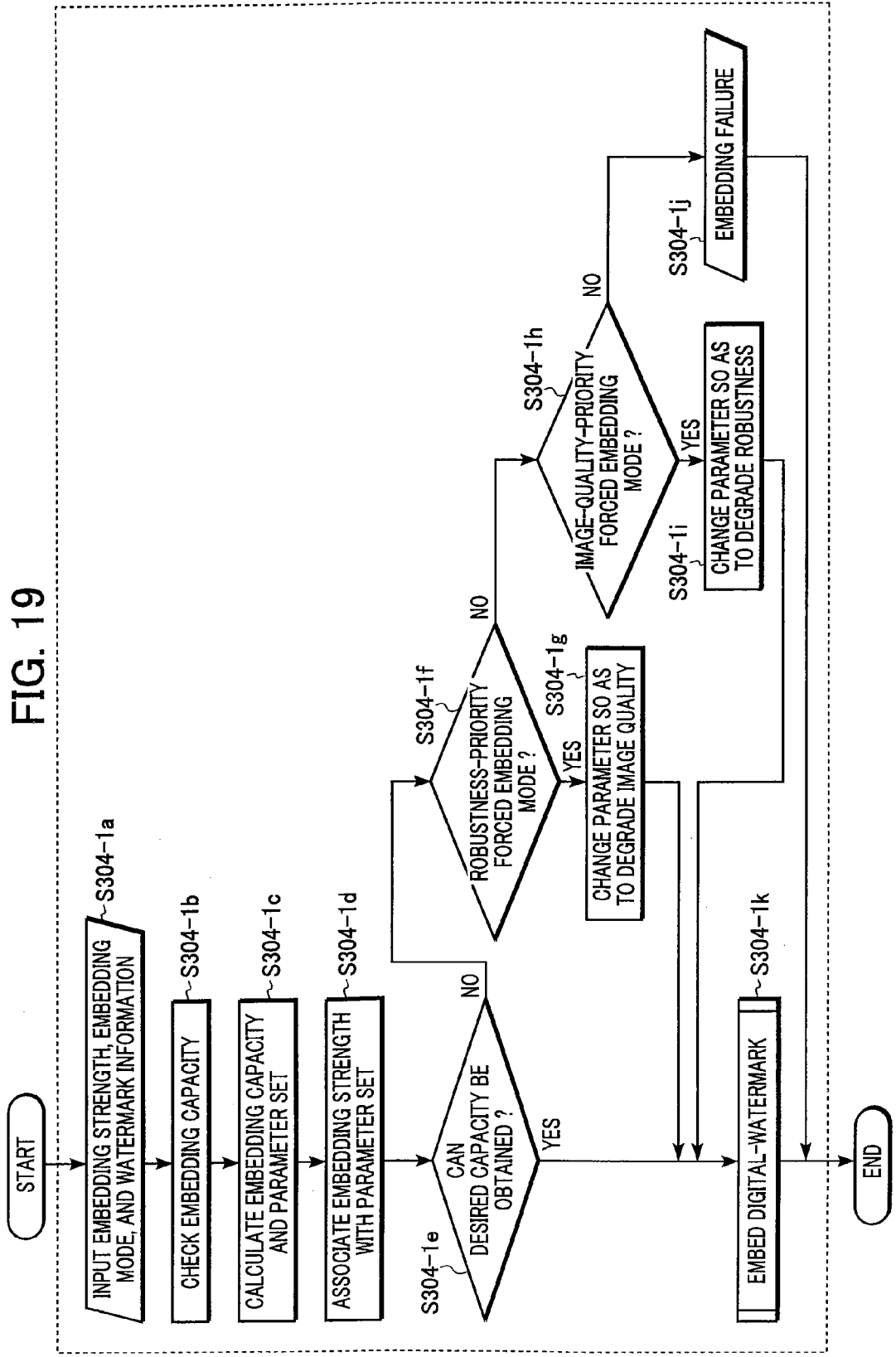
FIG. 19 is a flowchart of an embedding process performed by using an embedding capacity checking unit and an image-quality/robustness parameters control unit.

FIG. 19 is a flowchart for explaining an embedding process performed by using the embedding capacity checking unit 1104 and the image-quality/robustness parameters control unit 1109. First, embedding strength 1106, an embedding mode 1107, and digital-watermark information 1105 are input (step S304-1a).

Then, the number of letters in the image 1100, in which the digital-watermark information is to be embedded, is counted, so as to obtain basic data for calculating the capacity for embedding(step S304-1b). The minimum of the repetition number is set to 3, for example. This is the minimum number for absorbing instability at extraction of watermark information. The maximum of repetition number is set so that the amount of information which can be embedded does not become 0.

Then, the repetition number, which is an embedding parameter, is changed from the minimum to the maximum, so as to calculate the embedding capacity (step S304-1c). Herein, the image-quality parameter is fixed. In an algorithm for the calculation, embedding capacity can be obtained by dividing the number of letters by the repetition number. Of course, the embedding capacity is further reduced when header information is stored. In accordance with the algorithm, the repetition number is sequentially increased so as to calculate corresponding embedding capacity. FIG. 20 shows the combinations of values for obtaining each embedding capacity. In FIG. 20, when the repetition number is 3, the embedding capacity is 200.

Then, the calculated values are associated with embedding strength (step S304-1d). As shown in FIG. 20, 19 types of embedding capacitance are possible. On the other hand, the embedding strength is fixed to 10 levels, and thus the parameters and the embedding capacity must be thinned out. In this example, the embedding capacity when the repetition number is an even number is associated with each strength.

FIG. 20 shows embedding capacity labeled with $l_1$ to $l_{10}$, which is associated with embedding strength so as to present to the user. The corresponding image-quality parameters are constant, but they are labeled with $q_1$ to $q_{10}$ for generality. The corresponding repetition numbers are also labeled with $n_1$ to $n_{10}$. FIG. 21 shows groups of values which are associated with embedding strength.

Then, by using the result of step S304-1d, it is determined whether or not the embedding capacity obtained based on the embedding strength input by the user is larger than the digital-watermark information to be embedded (step S304-1e). If the embedding capacity is larger than the digital-watermark information (YES in the flowchart), the embedding process is continued (step S304-1k). At this time, the repetition number of embedding is maximized within the range of capacity for storing the digital-watermark information to be embedded.

For example, the user inputs digital-watermark information having embedding strength of 6 and length of 12. As can be understood from FIGS. 20 and 21, embedding capacity corresponding to embedding strength 6 is 18. However, since the size of the digital-watermark information is 12, the repetition number can be increased to 15, which corresponds to embedding capacity of 13. That is, robustness can be increased to embedding strength of 7.

On the other hand, when the result of step S304-1e is NO, it is determined whether or not the input embedding mode is the robustness-priority forced embedding mode (step S304-1f). If the result is YES, the image-quality parameter is decreased (step S304-1g), so as to perform the embedding step (step S304-1k).

On the other hand, when the result of step S304-1f is NO, it is determined whether or not the input embedding mode is the image-quality-priority forced embedding mode (S304-1h). If the result is YES, the robustness parameter is decreased (step S304-1i), so as to perform the embedding step (step S304-1k). On the other hand, if the result is NO, the mode is the normal mode. In this case, embedding failure is notified to the user (step S304-1j), so as to end the process.

Sixth Embodiment

In the fifth embodiment, information input by the user is embedded in accordance with an embedding mode, and the embedding process is ended in failure if embedding capacity is insufficient. In the sixth embodiment, capacity which is available for embedding is presented in advance, so that the user can specify embedding strength. Hereinafter, part different from that of the fifth embodiment will be described with reference to the drawings.

Figure 22:
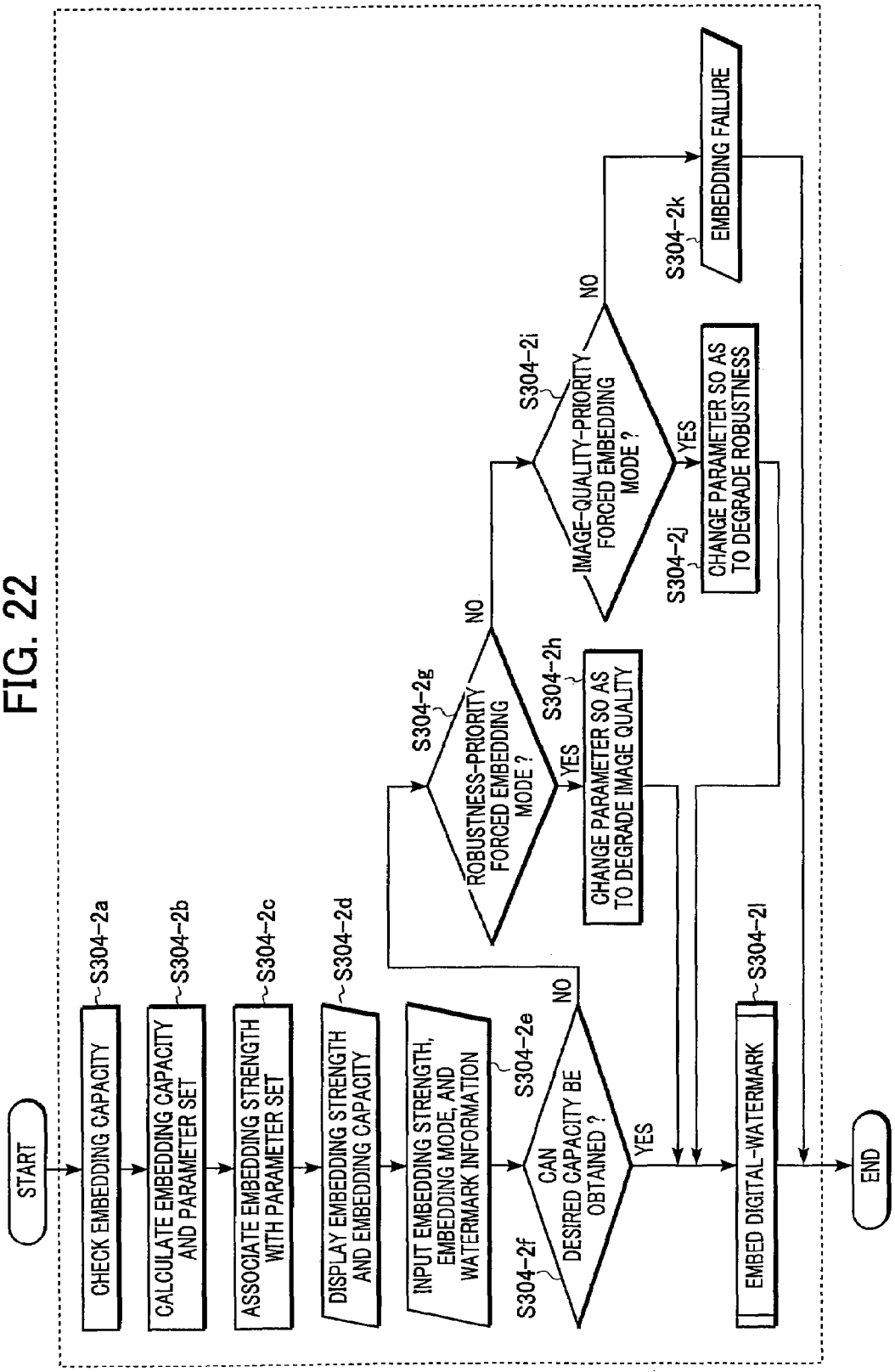
FIG. 22 is a flowchart showing an operation of a digital-watermark embedding device according to a sixth embodiment.

FIG. 22 is a flowchart for explaining the operation of the digital-watermark embedding device according to the sixth embodiment. A step of obtaining basic data for calculating embedding capacity (step S304-2a), a step of calculating embedding capacity (step S304-2b), and a step of associating parameters with embedding strength (step S304-2c) are the same as in the fifth embodiment. Then, a list of obtained embedding strength and corresponding embedding capacity is presented to the user (step S304-2d).

The user refers to the presented information so as to know constraint of embedding strength for obtaining desired embedding strength. After obtaining the information, the user inputs embedding strength, information to be embedded, and an embedding mode for specifying the extent to which embedding parameters can be changed (step S304-2e). The following steps are the same as in the fifth embodiment.

Seventh Embodiment

In the fifth and sixth embodiments, digital-watermark information is embedded by rotating a letter. The digital-watermark information can also be embedded by changing the space (length) between letters, as in the fourth embodiment. This method has been described above, and thus is not described here.

When digital-watermark information is embedded by changing the space between letters and when basic data for calculating embedding capacity is obtained in step S304-2b in FIG. 22, the data is not a simple number of letters, but ½ of the number of spaces between letters. The method for calculating the other values is the same as the above.

Figure 23:
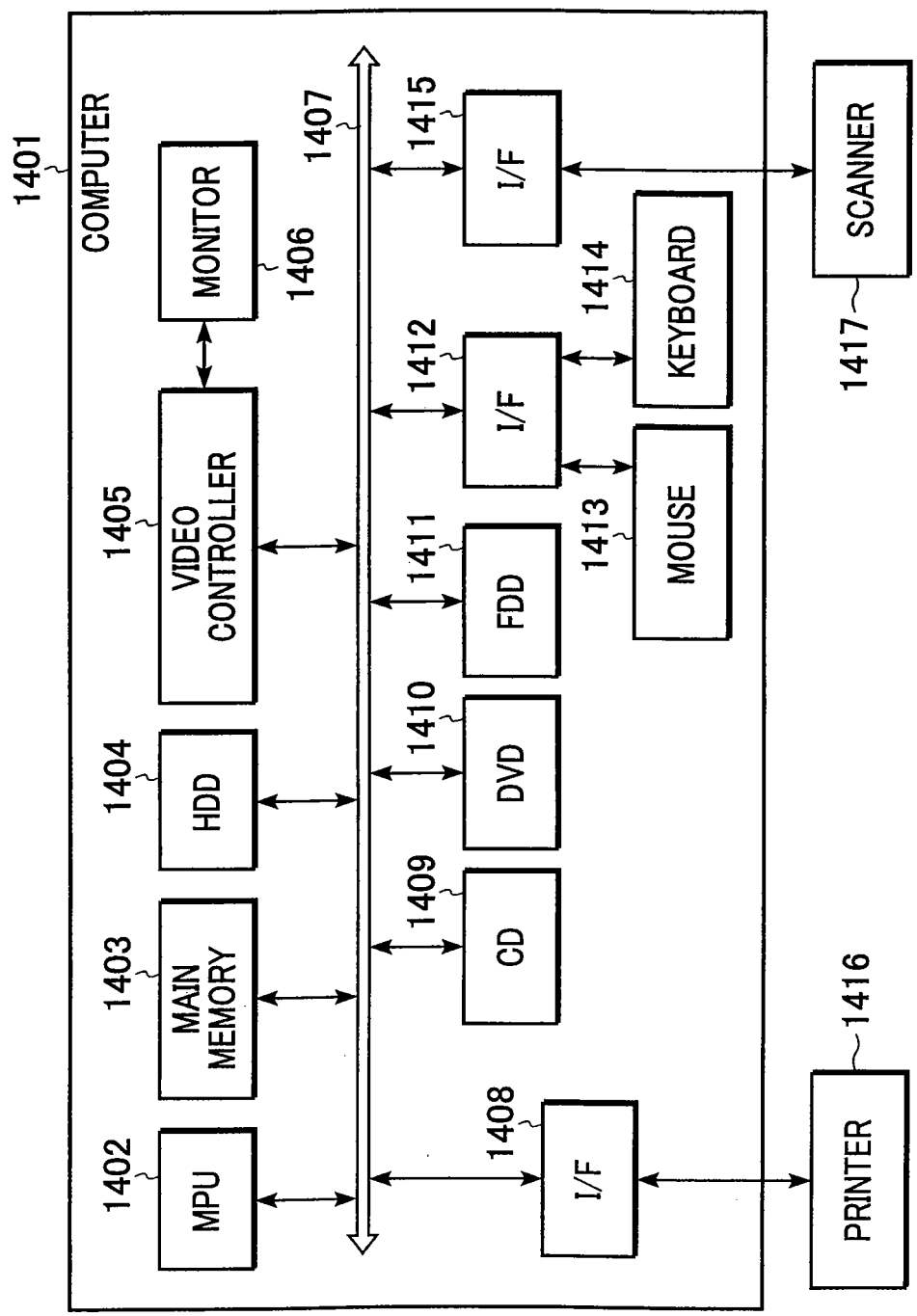
FIG. 23 shows the internal configuration of the digital-watermark embedding device.
Figure 24:
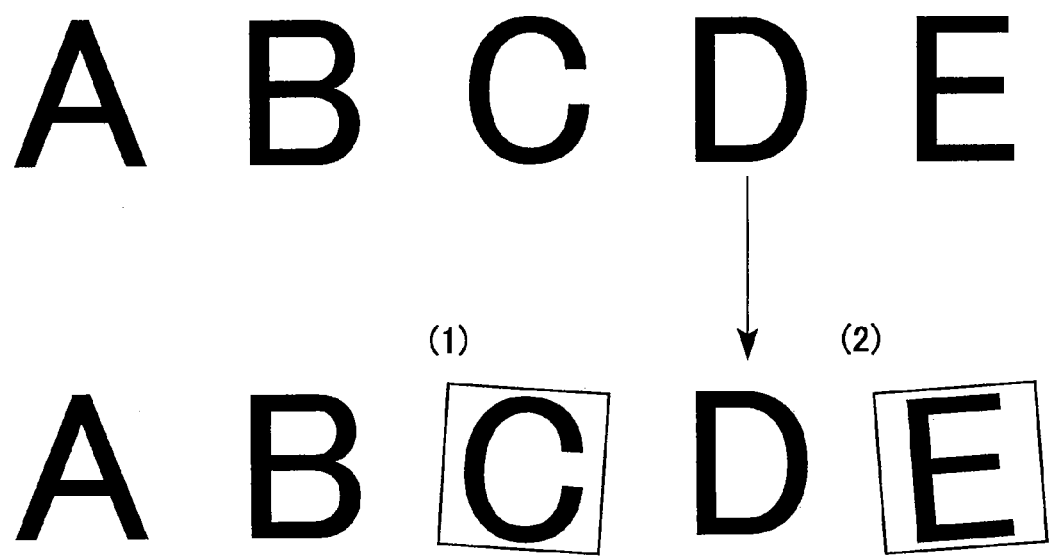
FIG. 24 shows an example of a known technique for embedding digital-watermark.

FIG. 23 shows an electrical configuration of the digital-watermark embedding device of the present invention. In order to realize the digital-watermark embedding device, all the functions shown in FIG. 23 are not necessarily required.

In FIG. 23, a computer 1401 is a generally-used personal computer. An image is read by an image input device 1417, such as a scanner, and is input to the computer 1401, where the image may be edited and stored therein. Also, the image obtained through the image input device 1417 can be printed by a printer 1416. Instructions from the user are input through a mouse 1413 or a keyboard 1414.

In the computer 1401, blocks (described later) are connected to each other through a bus 1407, so that various types of data may be transmitted/received by the blocks. In FIG. 23, an MPU 1402 controls the operations of the blocks in the computer 1401 and executes a stored program. A main memory 1403 is used for temporarily storing a program or image data to be processed, for the process executed by the MPU 1402. A hard disk drive (HDD) 1404 can store a program and image data to be transferred to the main memory 1403 and so on and can store processed image data.

A scanner interface (I/F) 1415 is connected to the scanner 1417, which scans a document or a film so as to generate image data, and the image data obtained by the scanner 1417 can be input through the scanner interface 1415. A printer interface 1408 is connected to the printer 1416, which prints image data, and transmits the image data to be printed to the printer 1416.

A CD drive 1409 reads data stored in a CD (CD-R/CD-RW) into the computer, the CD being an external storage medium, and writes out the data. An FD drive 1411 reads data stored in an FD into the computer and writes out the data, as the CD drive 1409. A DVD drive 1410 reads data stored in a DVD into the computer and writes out the data, as the FD drive 1411. When a program for editing images or a printer driver is stored in the CD, FD, or DVD, the program is installed in the HDD 1404, and then the program is transferred to the main memory 1403 as required.

An interface (I/F) 1412 is connected to the mouse 1413 and the keyboard 1414 so as to receive input instructions therefrom. A monitor 1406 is a display device for displaying a result of extracting process and processing of digital-watermark information. A video controller 1405 is used for transmitting display data to the monitor 1406.

The present invention may be applied to a system including a plurality of devices (for example, host computer, interface device, reader, and printer) or may be applied to a single device (for example, copying machine or fax machine).

Of course, the object of the present invention can be achieved by supplying a recording medium (or storage medium) containing program code of software for realizing the function of the above-described embodiments to a system or device so that the program code stored in the recording medium is read and executed by the computer (or CPU or MPU) in the system or device. In this case, the program code itself read from the recording medium realizes the function of the above-described embodiments. Therefore, the recording medium containing the program code is included in the present invention.

The functions of the above-described embodiments may be realized by executing the program code read by the computer. In addition, an operating system (OS) working in the computer may execute part or whole of actual processing based on the instructions of the program code, so that the functions of the above-described embodiments are realized by the processing.

Further, the program code read from the recording medium may be written in a memory provided in an expansions card inserted into the computer or an expansions unit connected to the computer and a CPU provided in the expansions card or the expansions unit may execute part or whole of actual processing based on the instructions of the program code, so that the functions of the above-described embodiments are realized by the processing.

If the present invention is applied to the recording medium, the program code corresponding to the above-described flowcharts is stored in the recording medium.

As described above, according to the present invention, an error state in which digital-watermark information cannot be embedded can be suppressed. That is, digital-watermark information can be embedded forcedly. Also, various parameters can be efficiently adjusted in accordance with a desired priority. Specifically, when a high priority is given to image quality, various parameters can be changed stepwise while the image quality can be maintained. On the other hand, when a high priority is given to robustness to attack (embedding strength), various parameters can be changed stepwise while the robustness can be maintained.

The priority can be set before operation, or when it is determined that the entire digital-watermark information cannot be embedded correctly in an image. That is, the priority should be set before deciding the most important parameter so as to change parameter group.

Further, according to the method of the present invention, a user can recognize the relationship between the amount of information which can be embedded and embedding strength when digital-watermark information is embedded in a document image.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for embedding a digital-watermark in a document image, comprising:

inputting the document image and digital-watermark information;

counting a number of letters in the document image;

calculating an embedding capacity based on the number of the letters;

determining whether or not the entire digital-watermark information is capable of being embedded in the document image based on the calculated embedding capacity; and embedding the digital-watermark information in the document image based on a result of the determination of whether or not the entire digital-watermark information is capable of being embedded in the document image.

2. The method according to claim 1, further comprising:

inputting an embedding strength of the digital-watermark; and setting a first parameter determining robustness to attack on the digital-watermark information to be embedded in the image and a second parameter determining quality of the image in which the digital-watermark information is to be embedded in accordance with the embedding strength, wherein the embedding capacity is calculated based on the number of letters and the embedding strength, and wherein, when it is determined that the entire digital-watermark information is not capable of being embedded, at least one of the parameters is updated so as to embed a larger amount of the digital-watermark information in the image in accordance with a robustness-priority forced embedding mode or an image-quality-priority forced embedding mode, and the digital-watermark is embedded using the updated parameter.

3. The method according to claim 2, wherein the digital-watermark information is embedded in the document image by rotating the letters so as to change the inclination angle of the letters.

4. The method according to claim 3, wherein the second parameter specifies the range of rotation angle of the letters.

5. The method according to claim 3, wherein the first parameter specifies the repetition number of embedding the digital-watermark information in the image.

6. The method according to claim 2, wherein the digital-watermark information is embedded in the document image by changing the positions of the letters so as to adjust spaces between the letters.

7. The method according to claim 6, wherein the second parameter specifies the range of movement of the letters.

8. The method according to claim 6, wherein the first parameter specifies the repetition number of embedding the digital-watermark information in the image.

9. An apparatus comprising:

an input unit configured to receive a document image and digital-watermark information;

a first determination unit configured to determine an embedding capacity based on a number of the letters in the document image;

a second determination unit configured to determine whether or not the entire digital-watermark information is capable of being embedded in the document image based on the determined embedding capacity; and an embedding unit configured to embed the digital-watermark information in the document image based on a result of the determination of whether or not the entire digital-watermark information is capable of being embedded in the document image.

10. The apparatus according to claim 9, further comprising:
an embedding strength input unit configured receive information associated with an embedding strength of the digital-watermark; and
a setting unit configured to set a first parameter determining robustness to attack on the digital-watermark information to be embedded in the image and a second parameter determining quality of the image in which the digital-watermark information is to be embedded based on the information associated with the embedding strength of the digital-watermark,
wherein the embedding capacity is determined based on the number of letters and the information associated with the embedding strength of the digital-watermark,
wherein, when it is determined that the entire digital-watermark information is not capable of being embedded, at least one of the parameters is updated so as to embed a larger amount of the digital-watermark information in the image in accordance with a robustness-priority forced embedding mode or an image-quality-priority forced embedding mode, and the digital-watermark is embedded using the updated parameter.

11. A computer-readable medium storing instructions which, when executed by an apparatus, causes the apparatus to perform operations comprising:
receiving a document image and digital-watermark information;
determining an embedding capacity based on a number of the letters in the document image;
determining whether or not the entire digital-watermark information is capable of being embedded in the document image based on the determined embedding capacity; and
embedding the digital-watermark information in the document image based on a result of the determination of whether or not the entire digital-watermark information is capable of being embedded in the document image.

12. The computer-readable medium according to claim 11, wherein the operations further comprise:
receiving information associated with an embedding strength of the digital-watermark; and
setting a first parameter determining robustness to attack on the digital-watermark information to be embedded in the image and a second parameter determining quality of the image in which the digital-watermark information is to be embedded based on the information associated with the embedding strength of the digital-watermark,
wherein the embedding capacity is determined based on the number of letters and the information associated with the embedding strength of the digital watermark, and
wherein, when it is determined that the entire digital-watermark information is not capable of being embedded, at least one of the parameters is updated so as to embed a larger amount of the digital-watermark information in the image in accordance with a robustness-priority forced embedding mode or an image-quality-priority forced embedding mode, and the digital-watermark is embedded using the updated parameter.

* * * * *